United States Patent
Leung

(10) Patent No.: US 11,148,085 B2
(45) Date of Patent: Oct. 19, 2021

(54) ELECTROSTATICALLY-CHARGED NANOFIBER MEDIA AND FABRICATION METHOD THEREOF

(71) Applicant: THE HONG KONG POLYTECHNIC UNIVERSITY, Hong Kong (CN)

(72) Inventor: Wallace Woon Fong Leung, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 325 days.

(21) Appl. No.: 16/207,857

(22) Filed: Dec. 3, 2018

(65) Prior Publication Data
US 2019/0314746 A1 Oct. 17, 2019

Related U.S. Application Data

(60) Provisional application No. 62/657,966, filed on Apr. 16, 2018.

(51) Int. Cl.
| | |
|---|---|
| *D06M 10/02* | (2006.01) |
| *B01D 46/00* | (2006.01) |
| *D01F 6/12* | (2006.01) |
| *D01D 5/00* | (2006.01) |
| *B01D 39/16* | (2006.01) |
| *B01D 46/10* | (2006.01) |

(Continued)

(52) U.S. Cl.
CPC ......... *B01D 39/1623* (2013.01); *B01D 46/10* (2013.01); *B32B 5/022* (2013.01);
(Continued)

(58) Field of Classification Search
CPC .............. B01D 39/1623; B01D 46/10; B01D 46/0032; B01D 2239/0631;
(Continued)

(56) References Cited

U.S. PATENT DOCUMENTS

2008/0264259 A1* 10/2008 Leung ................ B01D 46/0036
96/143
2010/0043639 A1 2/2010 Fox et al.
(Continued)

FOREIGN PATENT DOCUMENTS

| CN | 102949938 A | 3/2013 |
|---|---|---|
| CN | 104689641 A | 6/2015 |

(Continued)

OTHER PUBLICATIONS

International Search Report and Written Opinion of PCT application No. PCT/CN2018/121999 issued from the International Search Authority dated Mar. 15, 2019.

*Primary Examiner* — Jason M Greene
*Assistant Examiner* — Hafiz Muhammad Aamir
(74) *Attorney, Agent, or Firm* — Spruson & Ferguson (Hong Kong) Limited

(57) ABSTRACT

A charged multilayer nanofiber filter for air filtration and the fabrication method thereof is disclosed. The charged multilayer nanofiber filter has a plurality of charged nanofiber mats. Each of the plurality of charged nanofiber mats is obtained by charging nanofiber mats individually before assembling. The nanofiber mat comprises a nanofiber layer and a substrate layer. The plurality of charged nanofiber mats is assembled such that the nanofiber layers and the substrate layers are stacked together in an alternative manner. The charged multilayer nanofiber filter can be fabricated by electrospinning a polymer solution on the substrate layer to obtain a nanofiber mat, charging the nanofiber mat to obtain a charged nanofiber mat, and assembling a plurality of charged nanofiber mats to form the charged multilayer nanofiber filter.

17 Claims, 32 Drawing Sheets

(51) Int. Cl.
*B32B 5/02* (2006.01)
*B32B 5/26* (2006.01)

(52) U.S. Cl.
CPC ............. *B32B 5/26* (2013.01); *D01D 5/0076* (2013.01); *B32B 2250/20* (2013.01)

(58) Field of Classification Search
CPC ........ B01D 2239/065; B01D 2239/025; B01D 2239/0428; B01D 2239/0032; B32B 5/022; B32B 5/26; B32B 5/08; B32B 2250/20; B32B 2262/0284; B32B 2262/04; B32B 2262/0238; B32B 2262/0253; B32B 2262/0246; B32B 2262/0261; B32B 2262/0276; B32B 2262/14; B32B 2262/02; B32B 2262/023; B32B 2307/202; B32B 2307/732; B32B 2307/718; B32B 2535/00; D06M 10/025; D01F 6/12; D01D 5/0084
See application file for complete search history.

(56) References Cited

U.S. PATENT DOCUMENTS

| | | | | |
|---|---|---|---|---|
| 2014/0088618 | A1* | 3/2014 | Song | A61F 2/0063 606/151 |
| 2014/0116945 | A1* | 5/2014 | Kas | B01D 69/02 210/651 |
| 2014/0159262 | A1* | 6/2014 | Kay | B29D 99/0078 264/8 |
| 2015/0157971 | A1* | 6/2015 | Tong | D01D 5/003 96/74 |
| 2015/0273110 | A1* | 10/2015 | McClellan | A61L 27/34 427/2.24 |

FOREIGN PATENT DOCUMENTS

| | | |
|---|---|---|
| CN | 105280939 A | 1/2016 |
| CN | 107441827 A | 12/2017 |
| JP | 2017170352 A | 9/2017 |

* cited by examiner

| GSM | 1.75 | 3.5 | 5.25 | 7 |
|---|---|---|---|---|
| Reconfiguration from single to multilayers | Single layer to 2 layers | Single layer to 4 layers | Single layer to 6 layers | Single layer to 8 layers |
| Improvement in single fiber efficiency | 1.35X | >2X | 2.8X | 6.4X |

FIG. 12

ELECTROSTATICALLY-CHARGED NANOFIBER MEDIA AND FABRICATION METHOD THEREOF

CROSS-REFERENCE TO RELATED APPLICATIONS

This application claims the benefit of U.S. Provisional Patent Application No. 62/657,966, filed on Apr. 16, 2018, which is incorporated by reference herein in its entirety.

FIELD OF THE INVENTION

The present disclosure generally relates to a nanofiber media and fabrication method thereof. In particular, the present disclosure relates to an electrostatically-charged and charge-insulated nanofiber media for air filtration, western blot process and other applications.

BACKGROUND

Suspended dust and fine particles in atmospheric air are generally referred to as suspended particulate matter (PM). The large amount of fine suspended PM, especially PM2.5 with aerodynamic diameter $d_a \leq 2.5$ μm, emitted from human activities, e.g., traffic and industry, has created serious air pollution problems and raised a major public health concerns.

Nano-aerosols are airborne aerosols of 100 nanometers or less that may be responsible for the transmission of various viral diseases. They are present in high concentrations from pollutants to viruses, both of which can seriously affect the health of an individual by inhalation. Once entering our body, they can diffuse readily by virtue of their small size into different areas of the body, including vascular track, lymphatic track and nerve track and may cause serious chronic diseases. Effective protective measures are urgently required to protect people from PM despite the challenge due to the small size of fine particles.

Filtration is one of the main methods used for removing particles from gas streams. Of the available filters, fibrous filters are relatively efficient at removing micro, submicron aerosols, and nano-aerosols (less than 100 nm), are widely applied in the areas of respirators, indoor air purification, vehicle air filtration and industrial gas cleaning, and can be economically produced and used. To improve filtration efficiency, two main approaches have been applied to the fabrication of fibrous filters, which include increasing fiber amount and reducing fiber diameter while maintaining basis weight.

Microfiber is a type of synthetic fiber having very fine threads. Typical microfibers are finer than one denier, and the thread has a diameter of less than 20 microns (or micrometers), and can be fabricated by melt-blown methods. At present, microfibers with a diameter of 2 to 20 microns are typically made from polyesters, polyamides, or a combination of polyester, polyamide, and polypropylene. Microfibers are generally soft, lightweight, strong, durable, more breathable, and provide better thermal insulation. Therefore, microfibers are widely used in clothing, cleaning articles, and heat insulation.

The electret fibrous filters, which use electrical attraction between the fibers and particles having net or induced charge, has been the focus of considerable research and development in recent years. Electret fibrous filters can be fabricated with less densely compacted fibers, because of the imparted electrostatic force from the surface/volume charge or dipoles, thus reducing air flow resistance while keeping high filtration efficiency. Generally, to exhibit electret properties, the material should have sufficient charge traps or be easily polarized. In particular, the dielectrophoretic effect of the filter can induce dipoles on the particles such that neutrally charged particles are attracted when in close proximity with charged fibers in a filter. The subsequent electrical interaction between the dipole of the particle and the charged fiber results in particle capture by the filter.

However, when microfibers are used to make electrostatically charged filter media (or electret media), the performance is less than satisfactory. As it is known that the electrostatic force between two objects is inversely proportional to the square of the corresponding separation distance. Considering that the fiber diameter of a microfiber is not sufficiently small, the electrostatic force on the microfiber for attracting charged particles or inducing dipoles on the neutrally charged particles for the purpose of filtration is not significantly large. Thus, microfibers are not effective nano-aerosol filters, because of their relatively large fiber diameter.

With a view towards improving the electrostatic force of microfibers, some research has focused on developing electrostatically-charged nanofibers from polyvinylidene fluoride (PVDF) using enhanced polytetrafluoroethylene (PTFE) nanoparticles. However, the developed nanofiber was not stable and the charges therein escape rapidly in a few hours especially in humid environments.

Accordingly, there is a need in the art to develop an electrostatically-charged and stable nanofiber (or electret nanofiber media) having reduced fiber diameters capable of exerting larger electrical forces for attracting charged particles and/or inducing dipoles on the neutrally charged particles, and subsequently attracting them.

SUMMARY OF THE INVENTION

It is an object of the present disclosure to provide an electrostatically-charged multilayer nanofiber filter that can effectively induce dipoles on the neutrally charged particles and attract charged particles, preferably for performing air filtration, western blot process and other applications where trapped electrostatic charges are needed.

It is an object of the present disclosure to provide a nanofiber filter having a higher filtration efficiency and a lower pressure drop when compared with a charged or an uncharged single layer nanofiber filter of the same thickness.

It is a further object of the present disclosure to provide a stably charged nanofiber in which the charges do not decay rapidly even in a humid condition.

The charged multilayer nanofiber filter can be fabricated by (1) electrospinning a polymer solution on a substrate layer using an electrospinning apparatus to obtain a nanofiber mat having a nanofiber layer and the substrate layer; (2) drying the nanofiber mat in a vacuum oven to remove any residual solvent; (3) immersing the nanofiber mat in alcohol or aqueous fluid, including water, to discharge any residual charges left on the nanofiber mat due to electrospinning that can resist the charging of the fiber mat; (4) charging the nanofiber mat to obtain a charged nanofiber mat; and (5) assembling a plurality of charged nanofiber mats to form the charged multilayer nanofiber filter wherein the plurality of charged nanofiber mats is arranged in parallel to each other but largely perpendicular to the air flow. The step of assembling the plurality of charged nanofiber mats further comprises assembling the plurality of charged nanofiber mats such that the nanofiber layers and the substrate layers are stacked together in an alternative manner.

In accordance with a further aspect of the present disclosure, the charged nanofiber mat is charged by corona discharge with a charging voltage of 10 kV to 20 kV and a charging distance of 20 mm to 40 mm for a period of 20 to 100 seconds with an optimal time typically around 60 seconds.

In accordance with a further aspect of the present disclosure, the polymer solution is obtained by dissolving PVDF pellets into a mixture of DMF and acetone. The substrate is a grounded or negatively charged collector made of antistatic nonwoven microfibers for removing the residual charges after electrospinning.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF THE DRAWINGS

The appended drawings, where like reference numerals refer to identical or functionally similar elements, contain figures of certain embodiments to further illustrate and clarify various aspects, advantages and features of the electrostatically-charged and charge-insulated nanofiber media and the fabrication method disclosed herein. It will be appreciated that these drawings and graphs depict only certain embodiments of the invention and are not intended to limit its scope. The nanofiber media and the fabrication method disclosed herein will be described and explained with additional specificity and detail through the use of the accompanying drawings in which:

FIG. 12 is a table summarizing the performance (single fiber capture efficiency based on dielectrophoretic effect) of the nanofiber electret filters with different gsm and different layer arrangements.

DETAILED DESCRIPTION

Figure 1:
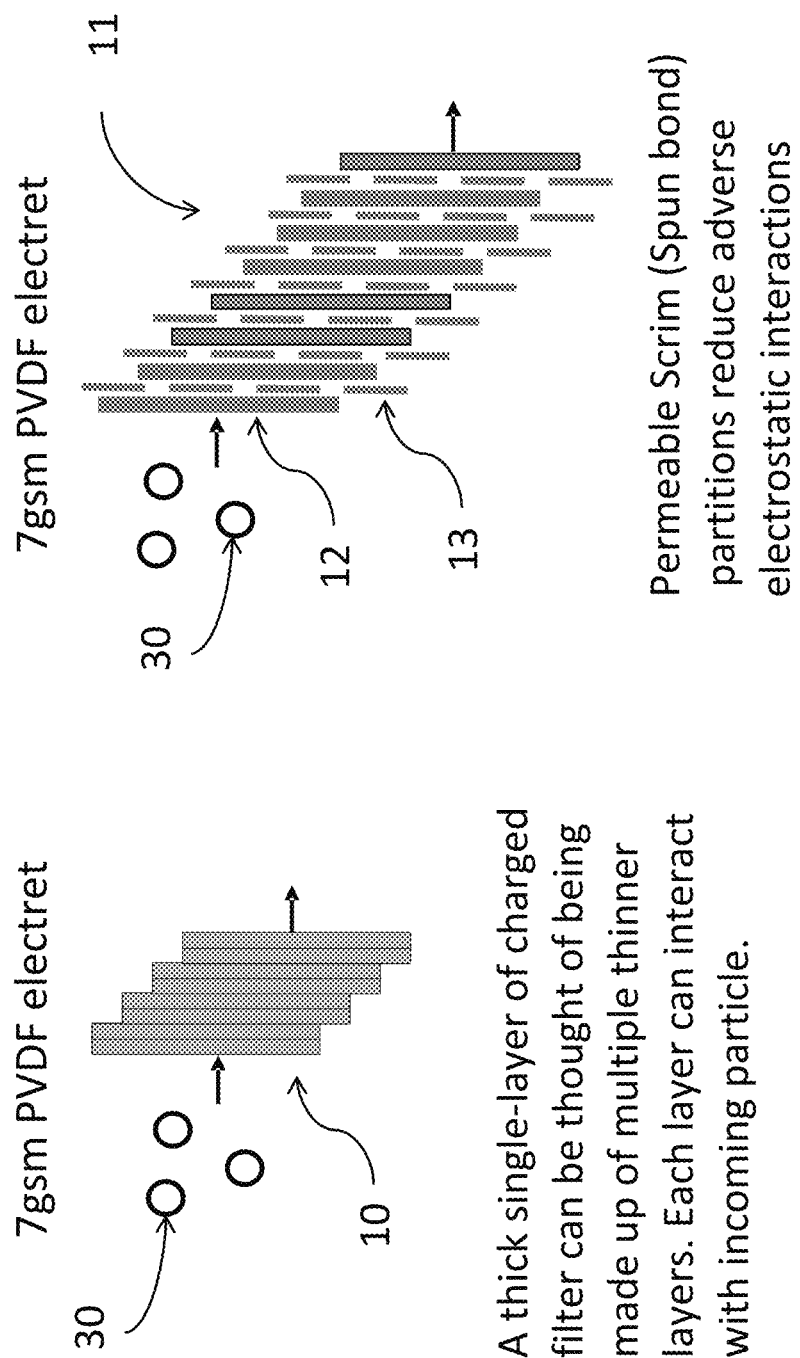
FIG. 1A depicts a drawing demonstrating a thick single-layer of charged filter made up of 7 gsm PVDF electret.
FIG. 1B depicts a drawing demonstrating a nanofiber filter made up of several thin layers of charged filters separated by permeable scrim partitions, and added up to 7 gsm PVDF electret.

The present disclosure generally relates to a nanofiber media and fabrication method thereof. In particular, the present invention relates to an electrostatically-charged and charge-insulated nanofiber media for air filtration, western blot process and other applications where trapped electrostatic charges are needed.

In the following detailed description, the device and the corresponding fabrication method are merely exemplary in nature and are not intended to limit the disclosure or its application and/or uses. It should be appreciated that a vast number of variations exist. The detailed description will enable those of ordinary skill in the art to implement an exemplary embodiment of the present disclosure without undue experimentation, and it is understood that various changes or modifications may be made in the function and arrangement of devices and methods described in the exemplary embodiment without departing from the scope of the present disclosure as set forth in the appended claims. The exemplary embodiments may not be limited to the precise embodiments described below, and may be practiced without some of these specific details. In other instances, structures and methods have not been described in detail, if already well known.

In the specification and the appended claims, the term "gsm" or "GSM" as used herein is a unit of measure for the thickness of a subject and refers to "gram per square meter" or "$g/m^2$".

The term "filtration efficiency" of a filter as used herein is a concept that quantifies the performance of all the numerous fibers to challenging air stream containing aerosols or particles. The single fiber efficiency is the equivalent efficiency of a single fiber in the filter per unit filter volume. It has factored in the fiber packing density, filter thickness, average fiber diameter and the filter efficiency. The single fiber efficiency is composed of two parts: (a) single fiber efficiency due to mechanical capture and (b) single fiber efficiency due to dielectrophoretic effect (inducing dipole on neutrally charged particles and capturing them by a charged fiber). These two capture mechanisms are additive assuming they interact independently with the neutral charged particles carried by the air flow. By subtracting the mechanical portion from the total single fiber efficiency, one can come up with the single fiber efficiency based on the dielectrophorteic effect alone. This index only measures electrostatic interactions between charged fiber and neutrally charged particles. It is independent of the fiber packing density, fiber diameter, and filter thickness. An electret filter, irrespective of the fiber packing density/basis weight, fiber diameter, filter thickness, and filter efficiency, has a higher performance due to electrostatic effect if the single fiber efficiency based on the dielectrophorteic effect is higher. It is a convenient way to compare electret filters of different configurations.

The term "quality factor" as used herein is used to measure the filtration performance of fibrous filters. It is a benefit-to-cost ratio (i.e. efficiency-to-pressure drop ratio).

The term "charged" as used herein means that an object has a net electrostatic charge, positive or negative polarity, relative to uncharged objects or those objects with no net electrostatic charge.

The term "electret" or "electret media" as used herein means electrically-charged dielectric material having a quasi-permanent electrostatic charge or dipole polarization. An electret can generate internal and external electric fields, and is electrostatic analog of a permanent magnet.

Furthermore, as used herein, the term "about" or "approximately", when used in conjunction with a numerical value or range of values, refers preferably to a range that is within 10 percent, preferably within 5 percent, or more preferably within 1 percent of a value with which the term is associated. The use of any and all examples, or exemplary language (e.g., "such as") provided herein, is intended merely to better illuminate the invention and does not pose a limitation on the scope of the invention unless otherwise claimed.

Unless specified otherwise, the terms "comprising" and "comprise", and grammatical variants thereof, are intended to represent "open" or "inclusive" language such that they include recited elements but also permit inclusion of additional, unrecited elements.

Fabrication of the Nanofiber Media

FIG. 1A shows a simplified drawing demonstrating the filtering of particles by a thick charged filter 10. A thick single-layer of nanofiber made up of 7 gsm PVDF electret can first be electrostatically-charged by either corona discharge or triboelectric effect to obtain a thick charged filter 10. The thick charged filter 10 can be thought of as a plurality of thinner layers stacked together. When neutral charged particles 30 flow towards and in proximity to the thick charged filter 10, an electric dipole is developed in each of the neutral charged particles 30. The strength of the dipole depends on the charge and the distance between the positive and negative charges. The distance between the positive and negative charges is higher for large particles, while the distance is smaller for small particles. Therefore, a large particle has a stronger dipole than a small particle. Besides, the positive or negative charges in the large particle are less likely to be recombined or neutralized, given that the distance separating is much further. For these reasons, a large particle has better benefit in both charge induction to form dipole and subsequent attraction by capturing the particle by electrostatic interaction. Interaction of dipoles with charged fiber at close range results in particle capture and the charge on the fiber attracts the opposite charge of the dipole on the particle to initiate capture of the particle to the fiber.

Figure 2:
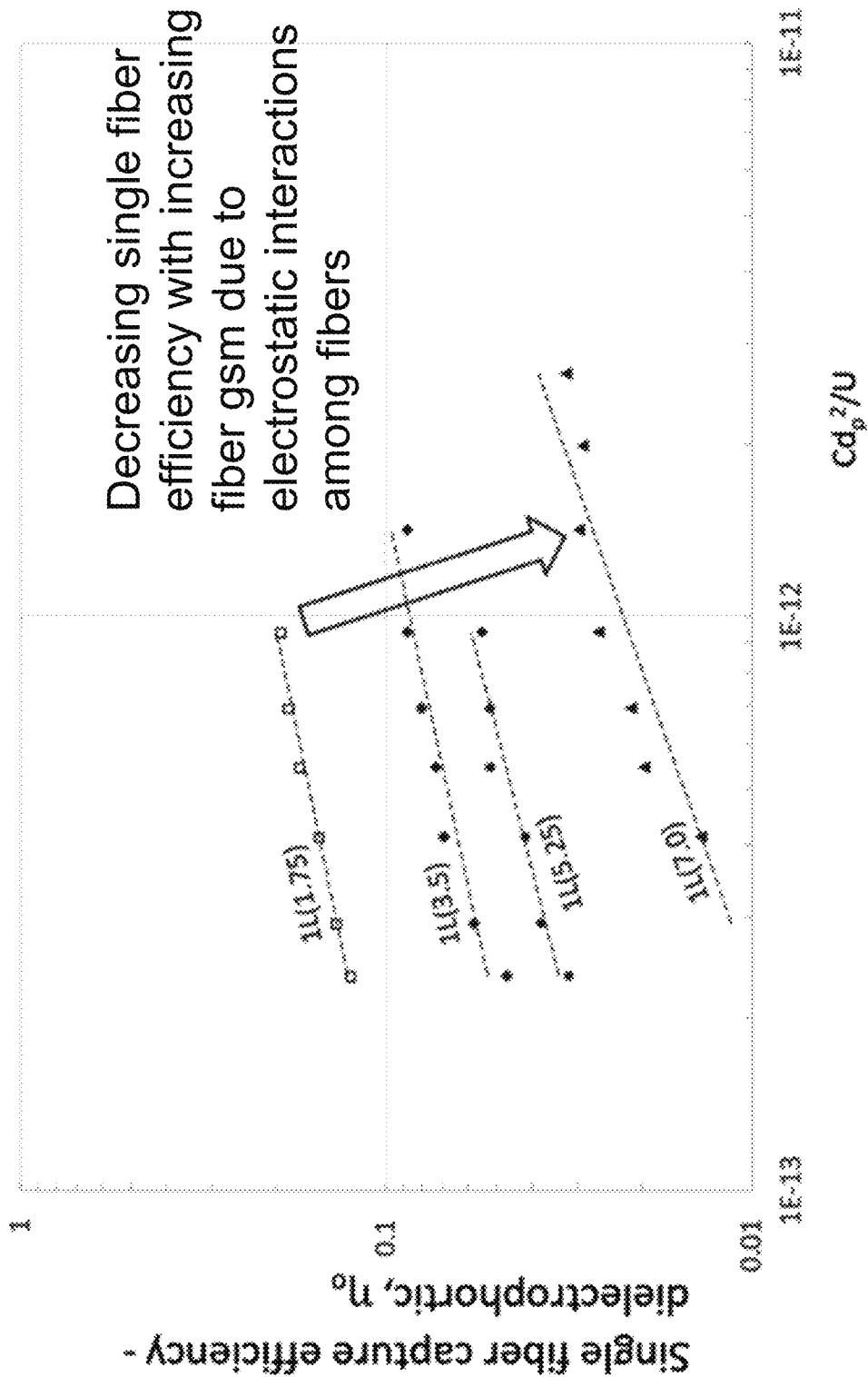
FIG. 2 is a graph showing the filtration efficiency of an equivalent single fiber capture efficiency based on dielectrophoretic effect for various nanofiber filters with different fiber gsm.

Charge retention of a fiber may or may not be beneficial depending on the application. Particularly for performing air filtration, charge retention over extended period of time is preferred as it improves the filtration efficiency. When a charged particle is getting close to the thick charged filter 10, the plurality of thinner layers that make up the thick charged filter 10 interacts electrostatically with the charged particle in a complicated manner. The interaction includes both opposite charge attraction and like charge repulsion. As a result, the capture of the particle by simple electrostatic attraction is reduced or moderated. This can be demonstrated by the graph in FIG. 2. Therefore, increasing the amount of fiber in a charged single layer filter can only decrease the filtration efficiency from the dielectrophoretic effect due to the electrostatic interactions among different sublayers in the charged single layer filter. With one layer of nanofiber, when the filter fibers amount or fiber basis weight, measured by gram per square meter of filter area, is increased from 1.75, 3.5, 5.25 to 7 gsm, the filtration efficiency drops from 0.2, 0.088, 0.06 to 0.023 for a fixed size of particle $d_p$ for which:

$$Cd_p^2/u = 1 \times 10^{-12} \tag{1}$$

where:

C is the Cunningham slip factor that depends solely on the particle size $d_p$; and u is the face velocity.

Referring to FIG. 1B, the interference effect can be mitigated if the partitioned charged filter 11 is divided into several thin fiber layers 12 having a total thickness of 7 gsm, which is equivalent to the thickness of the thick charged filter 10 of FIG. 1A. Each thin fiber layer 12 is charged and separated by a porous media (permeable scrim) 13, such as polypropylene. The porous media 13 is a spunbond for partition and serves as the electrical barriers that prevent the interference among the thin fiber layers 12, such that each thin fiber layer 12 can be considered as a layer existed by itself without any influences from other thin fiber layers 12. This arrangement of thin fiber layers 12 and porous media 13 is analogous to the structure of the nanofiber media of the present disclosure which can reduce the adverse electrostatic interactions. Another aspect of the present disclosure is to provide a fabrication method that can assemble multiply layers of charged nanofibers to obtain the nanofiber media as a filter with a higher filtration efficiency.

According to the Coulomb's Law, the electrical force between two non-contact charged objects is directly proportional to the product of the quantity of charges on the charged objects, and inversely proportional to the square of the separation distance:

$$F = \frac{kQ_1Q_2}{d^2} \tag{2}$$

where:

k is the Coulomb's law constant;

$Q_1$ and $Q_2$ are the quantity of charges on the two charged objects; and d is the separation distance center-to-center.

If a nanofiber can be developed with a diameter of 500 nm, the electrostatic force exerted on the charged particle rested on the nanofiber with 500 nm will be 400 times stronger than the electrostatic force exerted on the particle rested on microfiber with 10 microns, as shown below:

$$\frac{F_{nano}}{F_{micro}} = \left(\frac{d_{fm}}{d_{fn}}\right)^2 = \left(\frac{10}{0.5}\right)^2 = 400 \tag{3}$$

where:

$d_{fm}$ is the diameter of the microfiber; and $d_{fn}$ is the diameter of the nanofiber.

This behavior holds for nanofibers with even smaller diameters. In order to develop a good electrical insulator material, the present disclosure provides a fabrication method to make the nanofiber into a nanofiber mat, and to charge the nanofiber mat accordingly so that the charges remain therein stably over time. A plurality of charged nanofiber mats are assembled to a desired thickness to form a complete media for filtration and other applications where trapped electrostatic charges are needed.

Figure 3:
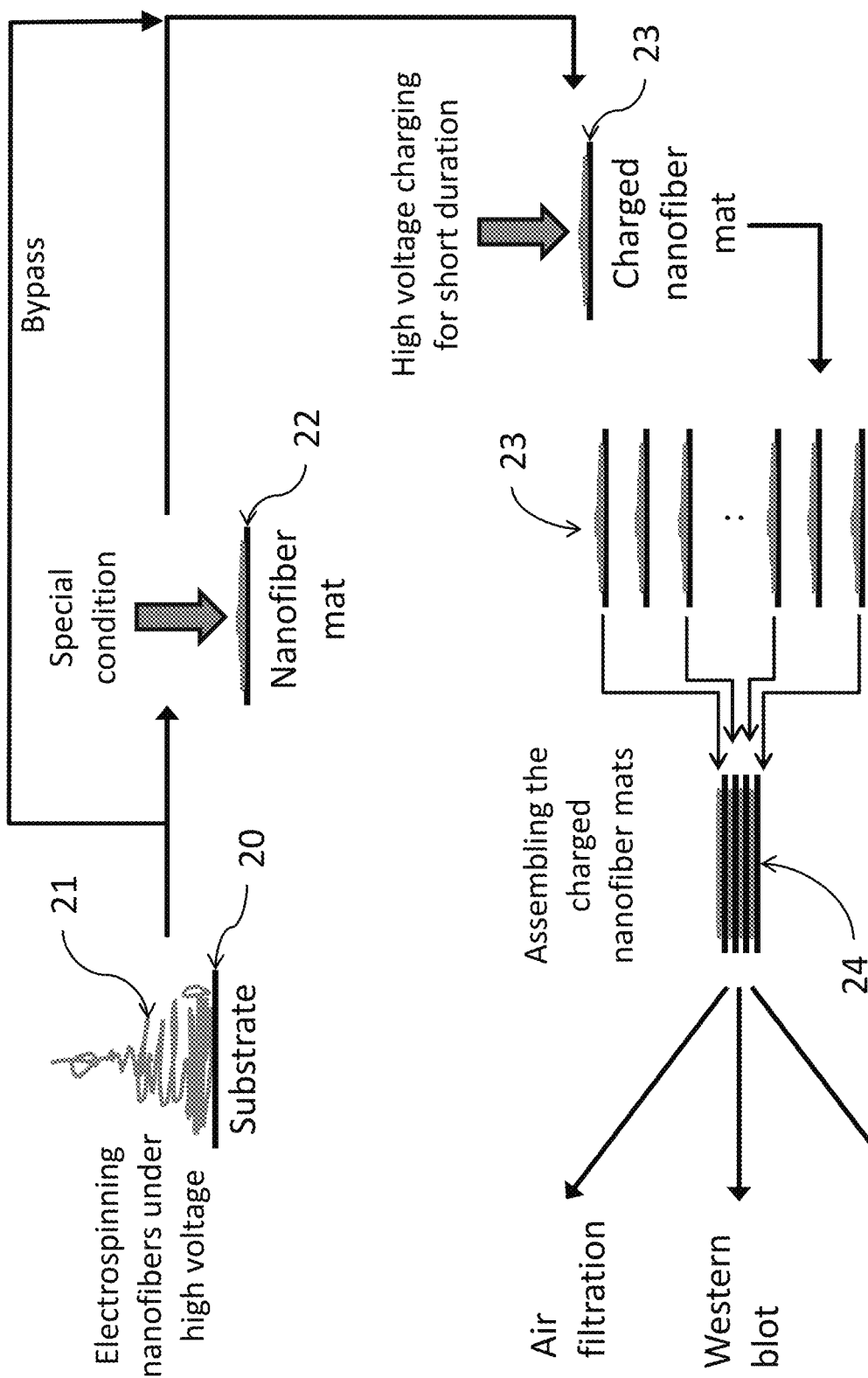
FIG. 3 depicts a method for preparing a charged multilayer nanofiber filter in accordance with certain embodiments of the present disclosure.

The electrostatically-charged nanofiber media may be obtained in a variety of ways. As shown in FIG. 3, a nanofiber layer 21 may be produced by electrospinning a polymer solution on a substrate layer 20 with an appropriate solvent. The polymer may be PVDF, polyolefin, polyacetal, polyamide, polyester, cellulose ether and ester, polyalkylene sulfide, polyarylene oxide, polysulfone, modified polysulfone polymers, nylon, polystyrene, polyacrylonitrile, polycarbonate and mixtures thereof. In one preferred embodiment, the nanofiber layer 21 may be formed by electrospinning PVDF into a mixture solvent of DMF/acetone (v/v 8/2) blended at 70° C. for 24 hours. In another embodiment, the nanofiber layer 21 may be formed by electrospinning nylon polymer with a 98% formic acid solution as solvent. In yet another embodiment, the nanofiber layer 21 may be formed by electrospinning polystyrene or polyvinyl chloride with solutions in tetrahydrofuran (THF) as solvent. In yet another embodiment, the nanofiber layer 21 may also be formed electrospinning polyethylene oxide (PEO) with water as solvent. In other alternative embodiments, nanofiber layer 21 may be obtained by melt-blown polymers onto a substrate layer 20. For example, polyethylene-terephthalate (PET) and polyethylene-naphthalate (PEN) may be electrospun or spin-melted into nanofiber layer 21 directly from their polymer melts.

The substrate layer 20 is a grounded or negatively charged collector, and may be in the shape of a plate or other customized shapes, such as a rotating drum, a pair of parallel electrodes, a frame, or an array of counter electrodes. The ground or negative voltage potential at the substrate layer 20 can remove the residual charges on the nanofiber layer 21 after electrospinning or spin-melting. The substrate layer 20 may include any porous and non-woven materials that may provide mechanical strength as support. For example, the substrate layer may include microfibers. In one preferred embodiment, the nanofibers from the electrospinning apparatus are directly electrospun onto the surface of the substrate layer 20 made of anti-static nonwoven microfibers, such as polypropylene (PP) cloth to obtain the nanofiber layer 21. In another embodiment, the substrate layer 20 may be placed in a liquid, and nanofibers may be electrospun onto the substrate layer 20. The liquid suspension may then be air-circulated, and the liquid may be removed under vacuum.

In order to prepare the nanofiber mat 22 for the present disclosure, PVDF with a molecular weight (MW) of 530,000 and sodium chloride (NaCl) were purchased from Sigma-Aldrich (USA). Isopropyl alcohol (IPA) and acetone were acquired from Anaqua Chemicals Supply (USA). N,N-Dimethylformamide (DMF) was obtained from Duk San Pure Chemicals Incorporated (South Korea). All reagents were analytical grade and used as received. All solutions were prepared with deionized water.

The PVDF solution can be prepared by dissolving 20 w/v % PVDF pellets into a mixture solvent of DMF/acetone (v/v 8/2) blended at 70° C. for 24 hours. The needle-based electrospinning machine (Model TL-Pro from Shenzhen Tong Li Tech Co. Ltd.) or other electrospinning apparatus is used to prepare PVDF nanofiber mats 22. The electrospinning apparatus consists of a micro syringe pump, a grounded drum collector and a high voltage supply set. The syringe pump can be used to feed the polymer solution into a 20-gauge steel needle tip (ID=0.6 mm) at the rates of 0.9 mL/h. The electrospinning process is carried out with a voltage of 20 kV, a tip-to-collector distance (traveling distance) of 15 cm and a drum rotating speed of 10 r/min. The temperature is preferred to be kept at 25±1° C. and the relative humidity (RH) is kept at 40±2%. The nanofibers are spun on the surface of a grounded steel drum covered with anti-static nonwoven PP cloth as substrate layer 20, which acted as the support of the nanofiber layer 21 to obtain a nanofiber mat 22. After spinning, the nanofiber mat 22 is dried in a vacuum oven at approximately 40° C. overnight to remove the residual solvent.

The nanofiber mat 22 is a single layer of fiber that can be quantified in accordance with the thickness. To get single-layer nanofiber mats 22 with different basis weights (W), different time durations of electrospinning can be used as the amount of fiber deposition is proportional to the electrospinning time. It is apparent that the thickness of the nanofiber mats 22 increases with a longer electrospinning time for forming the nanofiber mat 22. To a lesser extent the fiber packing density (a) is also increased slightly with electrospinning time when the basis weight is large, while for smaller basis weight, the fiber packing density can be assumed to be reasonably constant. Nanofiber mat 22 can be subject to special conditioning as shown in FIG. 3 where the nanofiber mat 22 is soaked in isopropanol or other forms of alcohol or aqueous fluid, including water, to discharge and remove residual charges left from on the nanofiber mat 22 due to electrospinning, which is referred to as "discharged nanofiber mat". These residual charges may affect adversely the subsequent charging. A discharged nanofiber mat 22 is found to have a better performance after being charged than a pristine nanofiber mat 22 as spun after being charged. If the residual charges are not significant, this step can also be bypassed as shown in FIG. 3.

The nanofiber mat 22 can be charged by corona discharge or possibly by triboelectric effect to obtain a charged nanofiber mat 23. Corona discharge is an electrical discharge to the nanofiber mat 22 by ionization of the surrounding air or other fluid using a conductor at high voltage and close distance. In certain embodiments, the corona discharge can be performed on a customized wire-type dual electrode device. A high voltage, either positive or negative, is applied to the five-wire (or multi-wire) emitting electrode made of tungsten, facing a 10 cm×10 cm filter mat attached on a grounded plate electrode. Charge is emitted around the energized wire electrode and deposited on the filter under the influence of the electric field. The distance between the wire and the grounded plate electrode is adjustable. The charging is carried out in ambient air at temperature of 20±2° C. with a relative humidity of 50±5%. The temperature and relative humidity may be controlled to other values to carry out the corona discharge without departing from the spirit and scope of the present invention. The charging time for the preparation of the charged nanofiber mat 23 is approximately 60 seconds, as it is found that a further prolongation of the charging time over 60 seconds will not bring apparent differences in the surface potential. A charging voltage of approximately 15 kV and a charging distance of 30 mm are used as the condition for the corona discharge. These have been optimized to provide the maximum corona discharge to the nanofiber mat 22 without locally burning the fibers from over-intensified electrical field. It is possible to use other conditions to carry out the corona discharge without departing from the spirit and scope of the present invention.

As an alternative, triboelectric effect may also be used to induce charges to the nanofiber mat 22 where different materials located at opposite ends of the triboelectric series are either in physical contact, or under relative motion generating friction at their contact surfaces, and inducing opposite charges deposited respectively on the two materials.

Amount of charges on the charged nanofiber mat 23 depends on factors such as the conditions of the corona discharge or triboelectric effect, environmental conditions and other secondary characteristics of the nanofiber mat 22, such as the moisture retention, type of polymer and conductivity. The charged nanofiber mat 23 is an electret filter that can already induce dipoles on the neutrally charged particles and attract charged particles.

A plurality of the charged nanofiber mats 23 is assembled to form a charged multilayer nanofiber filter 24 with correct grams of fibers per unit area. This configuration is made by stacking up a certain number of charged nanofiber mats 23, each with the same spinning duration to obtain an electrostatically-charged and charge-insulated nanofiber media of the present disclosure. Therefore an arrangement having a series of repeating and alternating arrangement of nanofiber layers and substrate layers is obtained. For example, 8 layers of charged nanofiber mats 23 each with the same thickness of 0.87 gsm are assembled to form a charged multilayer nanofiber filter 24 of a total filter thickness of 7 gsm. In certain embodiments, stacking of several layers of charged nanofiber mats 23 each with a different thickness, or stacking of several layers of media comprising nanofiber mats 22 (uncharged/pristine) and charged nanofiber mats 23 may also be used to fabricate the charged multilayer nanofiber filter 24 without departing from the spirit and scope of the present disclosure. In this way, charged multilayer nanofiber filters 24 with the same fiber packing density a but different total basis weights W and filter thickness Z of nanofiber layers were fabricated, with the basis weights W and filter thickness Z being in proportion to each other. In the subsequent analysis, each filter was denoted based on its configuration, either single layer (S) or multiple layers (M), layer basis weight and charging state. The charging state can be categorized into uncharged (pristine), discharged, or charged. A single layer of pristine filter is equivalent to the nanofiber mat 22 and is referred to as an as-spun filter. The substrate layer 20 on each layer of charged nanofiber mat 23 is analogous to the porous media 13 of FIG. 1B partitioning two adjacent thin fiber layers 12. Therefore, the substrate layer 20 can effectively reduce the adverse electrostatic interactions, and improve the filtration efficiency.

With the foregoing method, a charged nanofiber mat 23 is obtained out of charge-insulated materials and impregnated relatively permanent positive charges thereto such that the charges have long shelf life. The charged multilayer nanofiber filter 24, made from stacking these charged nanofiber mats 23, provides an excellent electret filter media for (a) performing air filtration with high performance; (b) transferring protein in western blot process; (c) capturing protein based drugs; and (d) releasing the drugs in a controllable manner. Advantageously, the present disclosure allows (a) putting maximum possible charges into the nanofibers with improved charge retention even under high relative humidity of 80%; and (b) developing nanofibers out of PVDF materials and polymeric materials with similar behavior as PVDF materials.

Physical Characteristics

To study the physical structure of the nanofiber mat 22, surface morphology of nanofiber mat 22 was performed using SEM (Model JSM-6490, JEOL, USA). The thickness of the substrate layer 20 was measured by a micrometer while the thickness of the nanofiber mat 22 was obtained using a surface profile device (Model DektakXT, Bruker, Germany). The weight of the substrate layer 20 and the nanofiber mat 22 were measured on an electronic balance, while the difference between the two values being the weight of the nanofiber layer. The surface potential of the filtration media was tested by an electrostatic voltmeter (Model 244A, Monroe, USA). In a typical measurement, surface potential of forty nine (49) 1 cm×1 cm grids on the evenly divided central 7 cm×7 cm part of a filter can be obtained. Both sides of the charged nanofiber mat 23 were tested, and the absolute difference was taken as the surface potential of a certain grid as the electric field over particles would be close to that value. The fiber packing density α of the nanofiber layer as well as the substrate layer 20 was calculated by the following mass balance equation:

$$W = \rho_s Z \alpha \quad (4)$$

where $\rho_s$ is the density of the polymer raw material.

Figure 23:
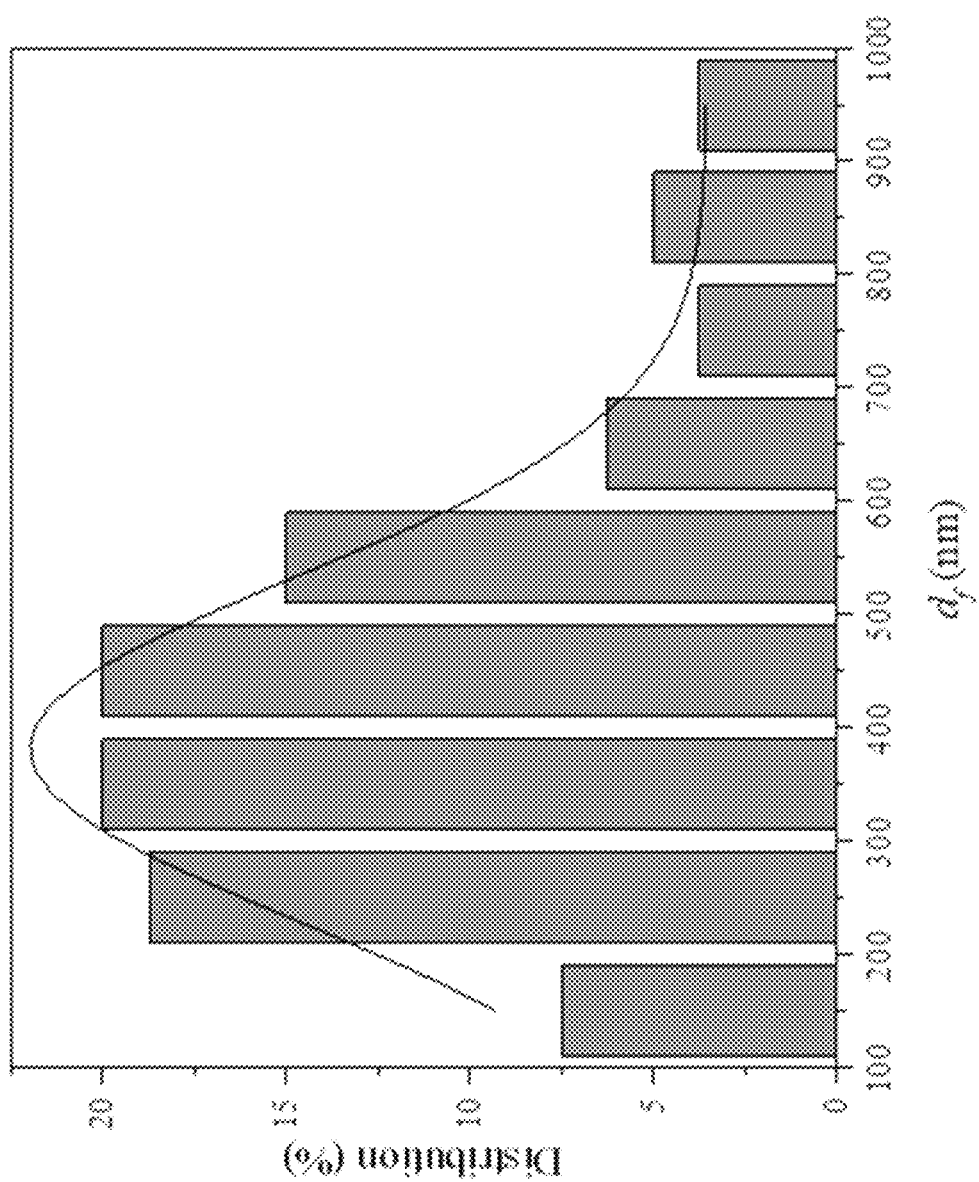
FIG. 23 is a bar graph depicting the distribution of the average diameter of fibers in a PVDF nanofiber filter according to certain embodiments described herein.

The aerosol capture performance of the nanofiber mat 22 is greatly affected by physical structure, particularly fiber diameters and their distribution, packing density and thickness, due to the varied influences on mechanical mechanisms of diffusion, interception and inertia impaction. As shown in FIG. 22A to FIG. 22E, the reticular structure of the nanofiber mat 22 (uncharged) with basis weight of 0.87 gsm, 1.75 gsm, 3.46 gsm, 5.10 gsm, and 6.98 gsm respectively are shown. All the filters showed randomly oriented fibers with polydisperse diameters. Since fiber diameter is mainly determined by solution property, voltage and distance used for electrospinning, filters varying in spinning duration will barely have identical fiber size. The fiber mean diameter of the nanofiber mat 22 is 450 nm as listed in Table I below and the diameter distribution is shown in FIG. 23. As demonstrated, the PVDF fiber packing density increased with basis weight, which can also be intuitively seen from the SEM pictures. The packing density is only 0.105 at the lowest GSM and increases to 0.276 at 3.46 g/m², after which the increment rate remarkably decreases and reaches 0.326 at 6.98 g/m². In contrast, the thickness of nanofiber layer does not significantly change for filters with GSM from 0.87 to 3.46 g/m² due to the relatively high porosity of these filters to accommodate more fibers without a drastic thickness increase. Another possible explanation is the electrostatic interaction (attraction) among the fibers. At higher GSM, filter thickness begins to increase with increasing fiber amount.

TABLE I

Physical parameters of PVDF filters and PP substrate

| Medium | $d_f$ (nm) | W (g/m²) | α (×10⁻²) | Z (μm) | ΔP (Pa) P | ΔP (Pa) C | ΔP (Pa) D |
|---|---|---|---|---|---|---|---|
| S-0.87 | 450 | 0.87 | 10.5 | 5.7 | 4.4 | 4.3 | n/a |
| S-1.75 | 450 | 1.75 | 16.2 | 7.1 | 6.1 | 5.6 | 5.6 |
| S-3.46 | 450 | 3.46 | 27.6 | 8.4 | 13.8 | 13.2 | n/a |
| S-5.10 | 450 | 5.10 | 30.7 | 10.4 | 20 | 19.3 | n/a |
| S-6.98 | 450 | 6.98 | 32.6 | 14.1 | 37.7 | 35.9 | n/a |
| M2-1.75 | 450 | 1.75 × 2 | 16.2 | 7.1 × 2 | 12.4 | 11.8 | n/a |
| M3-1.75 | 450 | 1.75 × 3 | 16.2 | 7.1 × 3 | 17.8 | 17.2 | n/a |
| M4-1.75 | 450 | 1.75 × 4 | 16.2 | 7.1 × 4 | 24.1 | 23.3 | n/a |
| M2-0.87 | 450 | 0.87 × 2 | 10.5 | 5.7 × 2 | 7.1 | 7.0 | n/a |
| M4-0.87 | 450 | 0.87 × 4 | 10.5 | 5.7 × 4 | 14.9 | 14.1 | n/a |
| M6-0.87 | 450 | 0.87 × 6 | 10.5 | 5.7 × 6 | 21.3 | 19.8 | n/a |
| M8-0.87 | 450 | 0.87 × 8 | 10.5 | 5.7 × 8 | 26.2 | 25.2 | n/a |
| M2-PP | 19324 | 30.86 × 2 | 34.29 | 100 × 2 | 3.6 | 3.6 | 3.6 |

Aerosol Filtration

Figure 20:
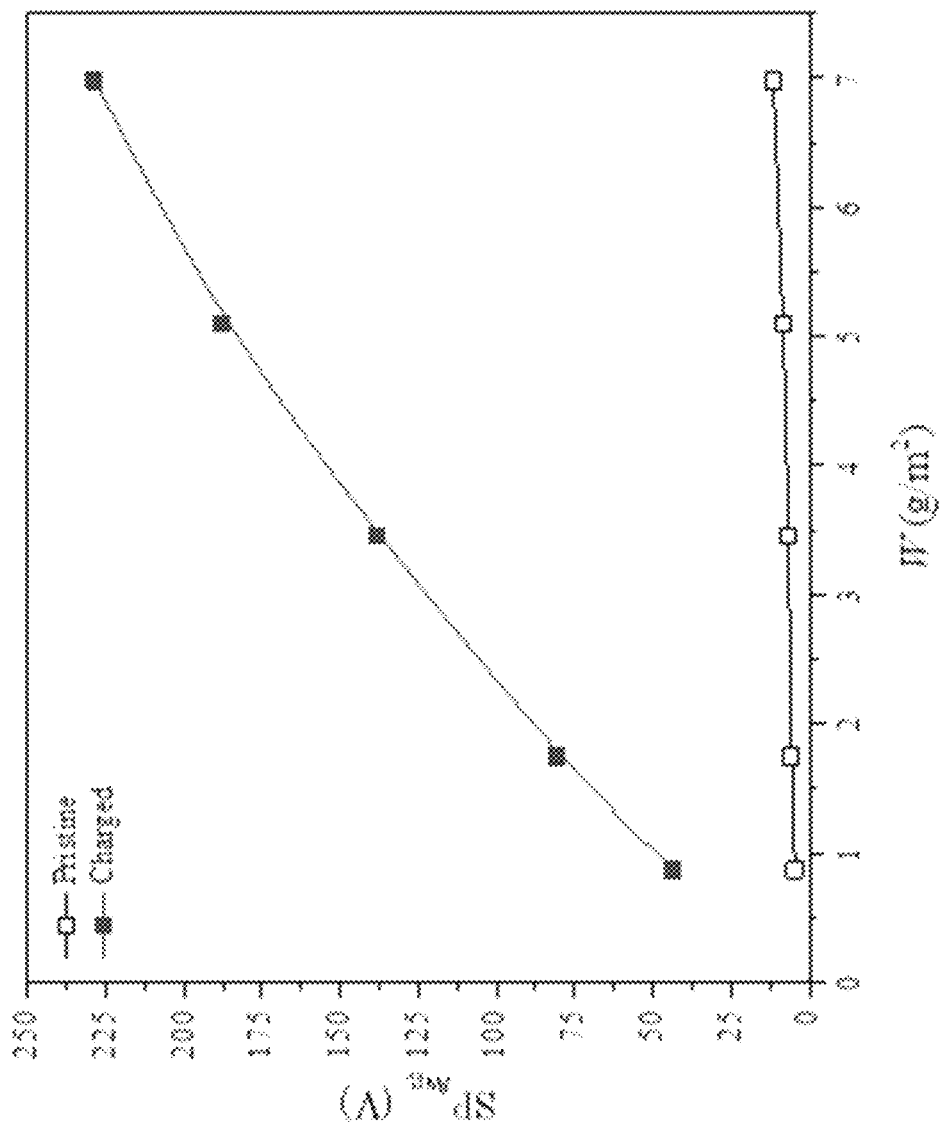
FIG. 20 is a graph showing the surface potential distribution on single layer of uncharged (pristine) and charged nanofiber filters with various basis weight of fibers.

The charged nanofiber mat 23 has been shown to benefit aerosol filtration compared with the nanofiber mat 22 (pristine) with the same basis weight (i.e. same GSM) of nanofibers. Therefore, the filtration performance of the charged nanofiber mat 23 improves the surface potential ($SP_{Avg}$) though particle capture by electrostatic interaction mechanism. This can be demonstrated by the result in FIG. 20, where the charge densities between the nanofiber mat 22 (pristine) and the charged nanofiber mat 23 with different basis weights (W) are compared. It is clear that the surface potential values increased with GSM, from $SP_{Avg.}$ of 80.8V at 1.75 g/m² to 228.6V at 6.98 g/m² resulting from more charge traps with higher amount of fibers. The increment of $SP_{Avg.}$ is not proportional to that of GSM and increased at a decreasing rate. This might be accounted for by two reasons. Firstly, during corona discharge, a sheath layer of charge with the same polarity as the emitting electrode might be formed close to the filter surface and inhibited further deposition of newly-generated charge carries. Secondly, fibers might act as a physical barrier and prevent a certain portion of charge from migrating to the deeper filter section, which was more significant with higher packing density, i.e. higher GSM.

This is very complex when taking charge polarity and distribution into account. To increase charge density, a proper electric field intensity for the corona discharge system has been proven to be critical for PP nonwoven electret, for which either too low or too high could lead to lower initial surface potential. By varying the charging voltages and distances, the influences on the surface potential and filtration performance of the charged nanofiber mat 23 is scrutinized. In order to get a clearer pattern, filters with a higher basis layer weight of 2.43 g/m² were used in these experiments.

Figure 18A:
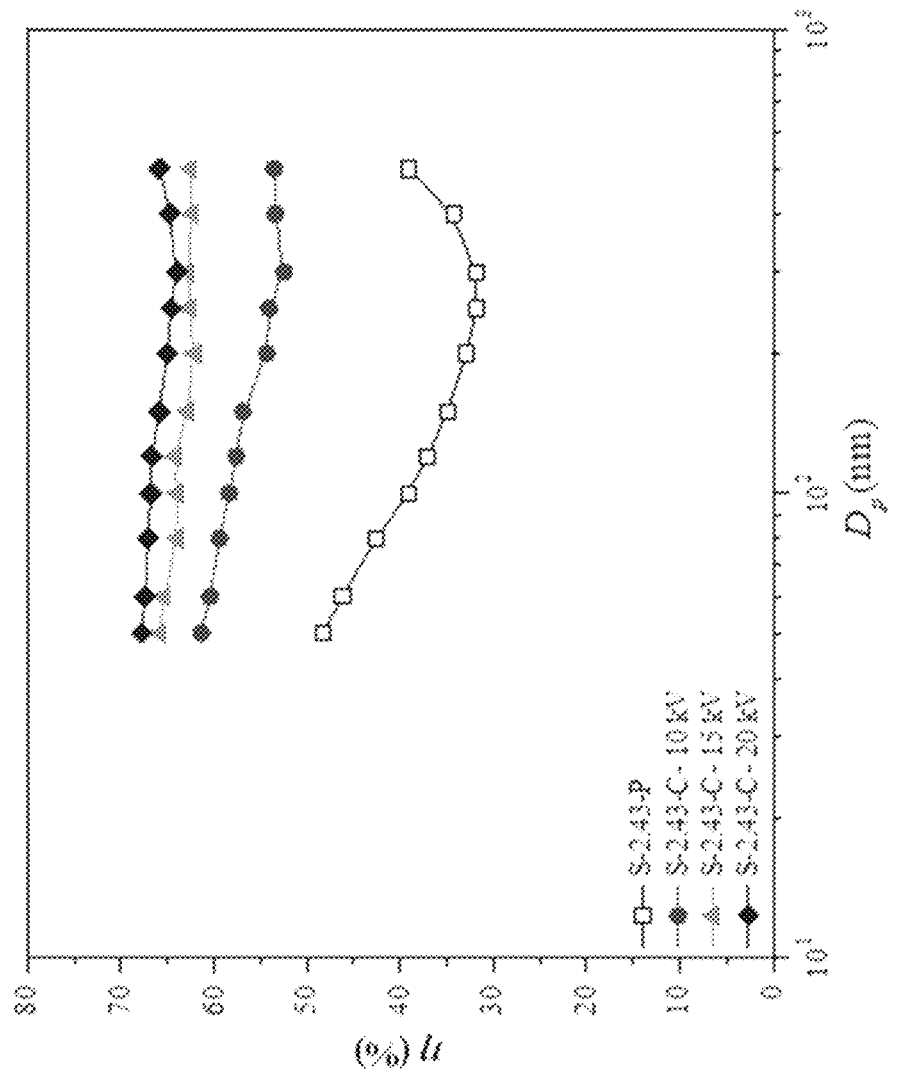
FIG. 18A is a graph showing the comparison on the filtration efficiency of single layer of uncharged (pristine) and charged nanofiber filters with varied charging voltages.
Figure 18B:
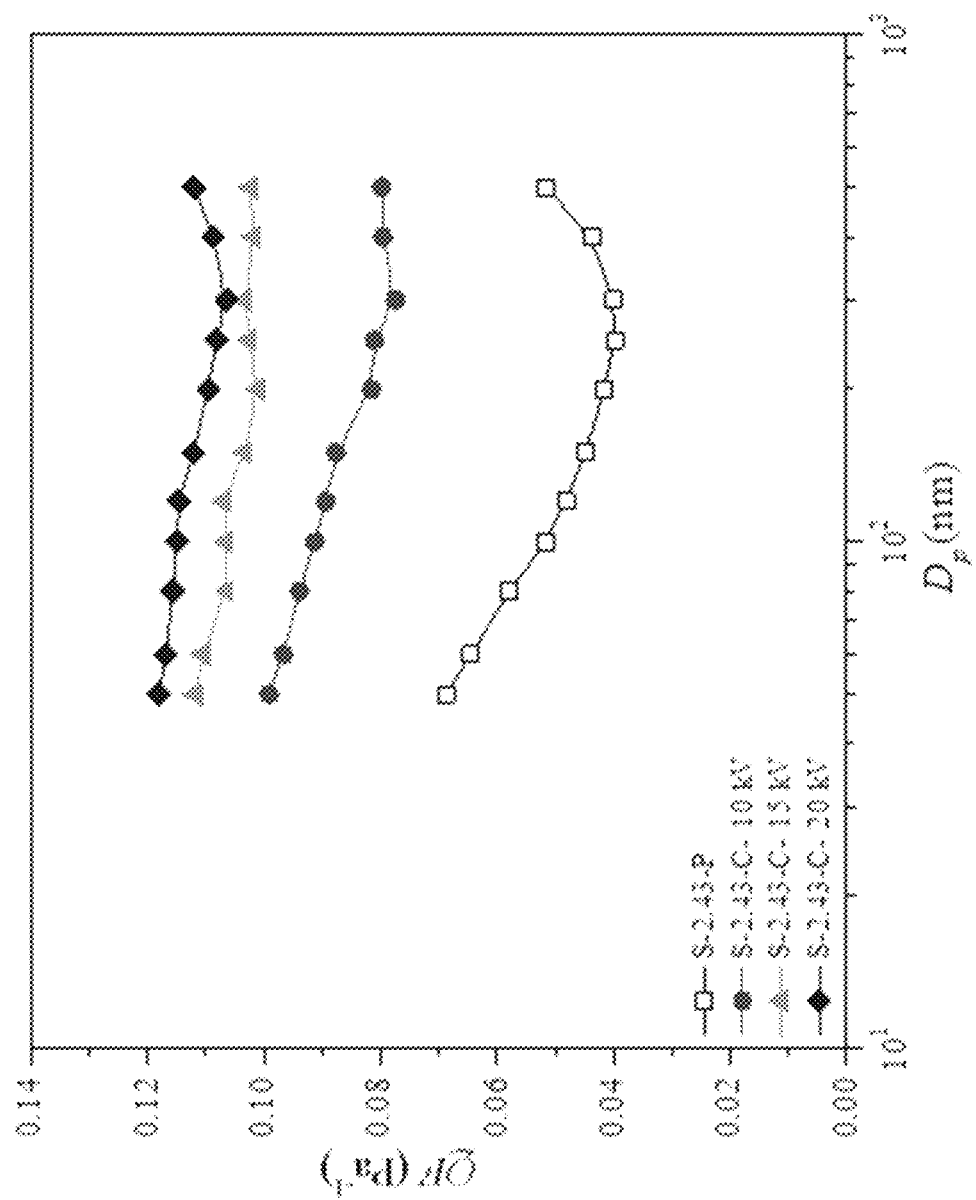
FIG. 18B is a graph showing the comparison on the quality factors of single layer of uncharged (pristine) and charged nanofiber filters with varied charging voltages.

Table II shows the $SP_{Avg}$ of the charged nanofiber mat 23 with different charging voltages varying from 81.9V at 10 kV to 115.2V at 20 kV. The results for the filtration efficiency and quality factor for different charging voltages are summarized by the graph in FIG. 18A and FIG. 18B, respectively. The filtration efficiency and quality factor are both higher at higher charging voltage, and even at the lowest voltage of 10 kV, the filtration performance of the charged nanofiber mat 23 is significantly improved over the nanofiber mat 22 (pristine).

TABLE II

Average surface potential ($SP_{Avg}$) of the charged nanofiber mat

| | Charging condition | | | $SP_{Avg}$ (V) | |
|---|---|---|---|---|---|
| Medium | Voltage (kV) | Distance (mm) | Duration (s) | Pristine | Charged |
| S-0.87 | 15 | 30 | 60 | 4.6 | 43.7 |
| S-1.75 | 15 | 30 | 60 | 5.8 | 80.8 |
| S-2.43 | 10 | 30 | 60 | 6.0 | 81.9 |
| S-2.43 | 15 | 30 | 60 | 6.0 | 100.8 |
| S-2.43 | 20 | 30 | 60 | 6.0 | 115.2 |
| S-2.43 | 15 | 35 | 60 | 6.0 | 86.7 |
| S-2.43 | 15 | 25 | 60 | 6.0 | 115.8 |
| S-3.46 | 15 | 30 | 60 | 6.6 | 138.1 |
| S-5.10 | 15 | 30 | 60 | 8.1 | 188.1 |
| S-6.98 | 15 | 30 | 60 | 11.5 | 228.6 |

Figure 19A:
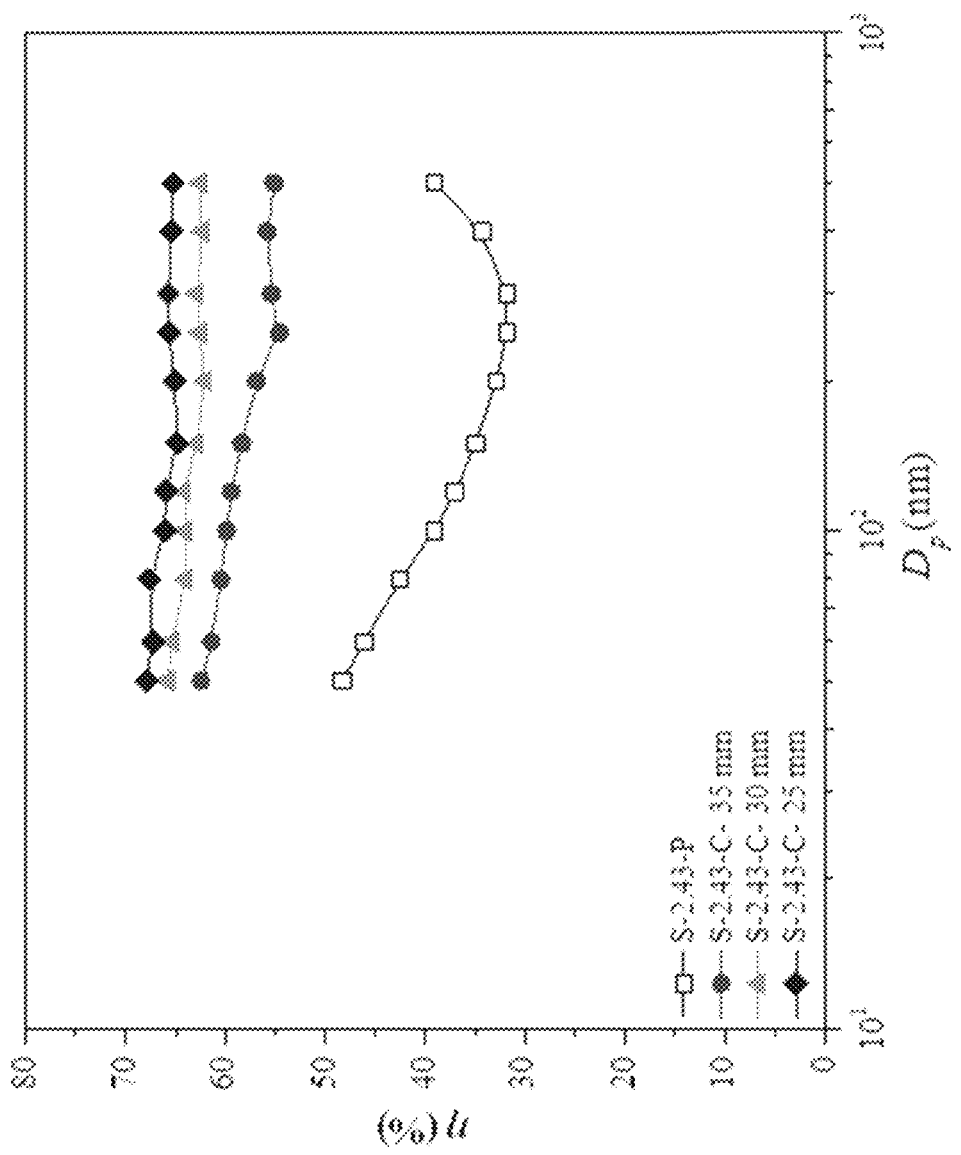
FIG. 19A is a graph showing the comparison on the filtration efficiency of single layer of uncharged (pristine) and charged nanofiber filters with varied charging distances.
Figure 19B:
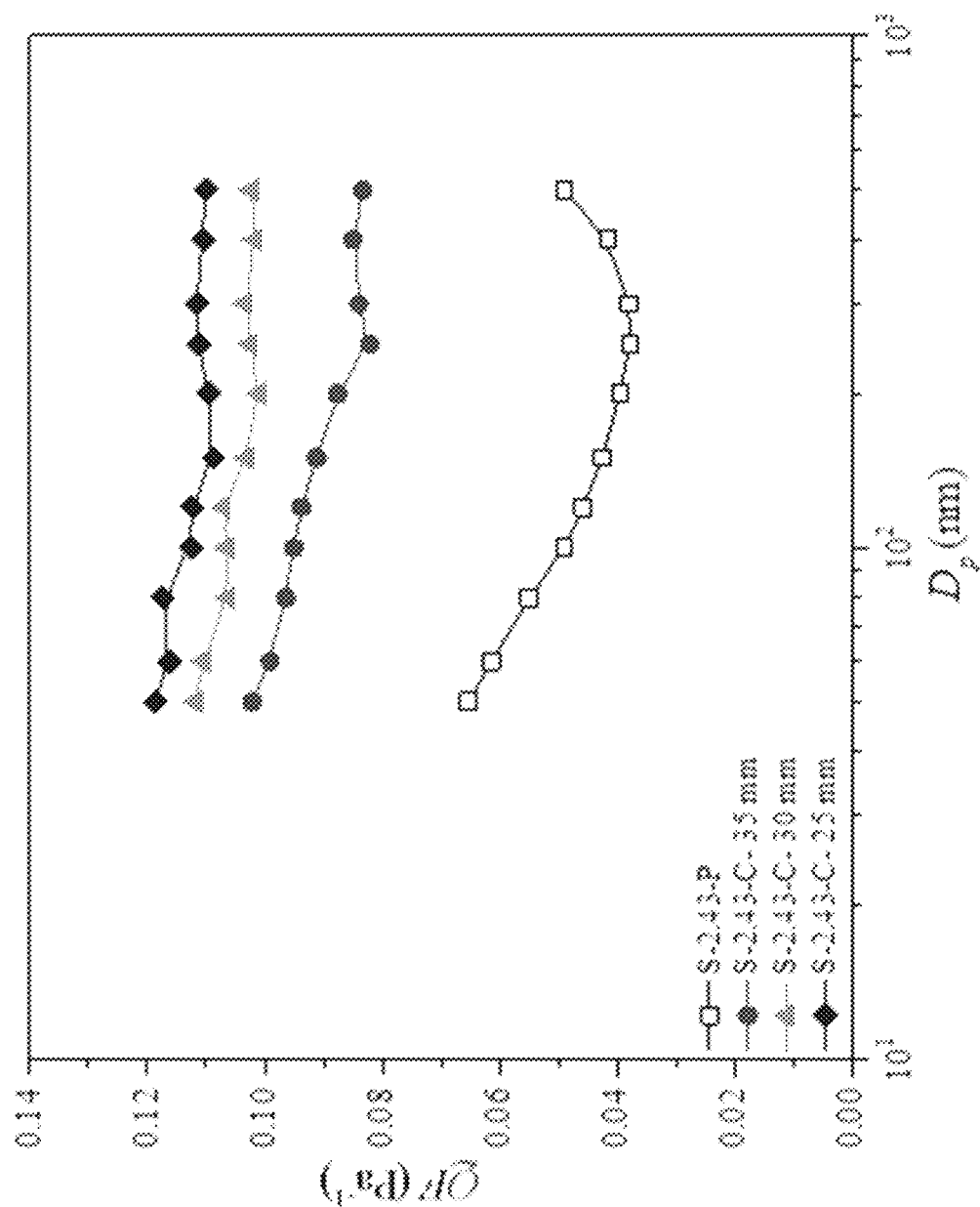
FIG. 19B is a graph showing the comparison on the quality factors of single layer of uncharged (pristine) and charged nanofiber filters with varied charging distances.

Table II also shows the $SP_{Avg}$ of the charged nanofiber mat 23 with different charging distance varying from 115.8V at 25 mm to 86.7V at 35 mm. The results for the filtration efficiency and quality factor for different charging distances are also summarized by the graph in FIG. 19A and FIG. 19B respectively. The reason could be that a shorter distance between the two electrodes led to a higher charge intensity as well as a lower charge loss in air In conformity to $SP_{Avg}$, a shorter distance favored the filter filtration performance as seen in FIG. 19A. At the largest distance of 35 mm, the QF of the filter increased by a factor of 1.5 to 2.1 as compared to the pristine filter as seen in FIG. 19B.

Better filtration performance could be obtained by using stronger electric filed. Nevertheless, further increasing the voltage or reducing the distance did not bring distinct enhancement, which might be due to charge saturation resulting from the limited charge traps for the charged nanofiber mat 23 with low solidity. In addition, the charge distribution was found more uniform when using low voltage or long distance. The uniformity of charges could avoid high local penetration from insufficient electrostatic force. Moreover, sparks were observed to generate at 20 kV or 25 mm, which confined the field intensity that could be applied. On the basis of the above result, filters charged optimally at voltage of 15 kV and distance of 30 mm would be used.

However, unsatisfactory filtration performance is noted in a high-GSM single layer of charged nanofiber mat 23. This is particularly demonstrated when dipole is induced to the approaching neutral particles which subsequently are attracted to the fiber surface by the attraction force of this single layer of charged nanofiber mat 23. When applying this in a real filter, each fiber is surrounded by many other fibers and various electric fields overlap, which may reduce the field strength in certain areas. For instance, the field between two fibers carrying charge of the same sign and amount may be quite low and even zero at points of symmetry, though outside the filter the field which does not contribute to the filtration may be very strong. Therefore, a lower packing density can mitigate the interference among fibers and larger increase the filtration performance. Secondly, most of the aerosols used to challenge the filters were free of net charge, a small portion of them hold certain amount of charge whose distribution followed Boltzmann's law. As a result, it was more likely that particles with higher electrical mobility were collected by the upstream layers of the PVDF filter, and the downstream layers were less efficient in trapping the remaining particles due to their weaker mobility. Furthermore, for relatively large particles, the densely-packed fibers in high-GSM filters may accelerate their velocity within the filter, thus leading to shorter retention time for electrical attraction.

Figure 4:
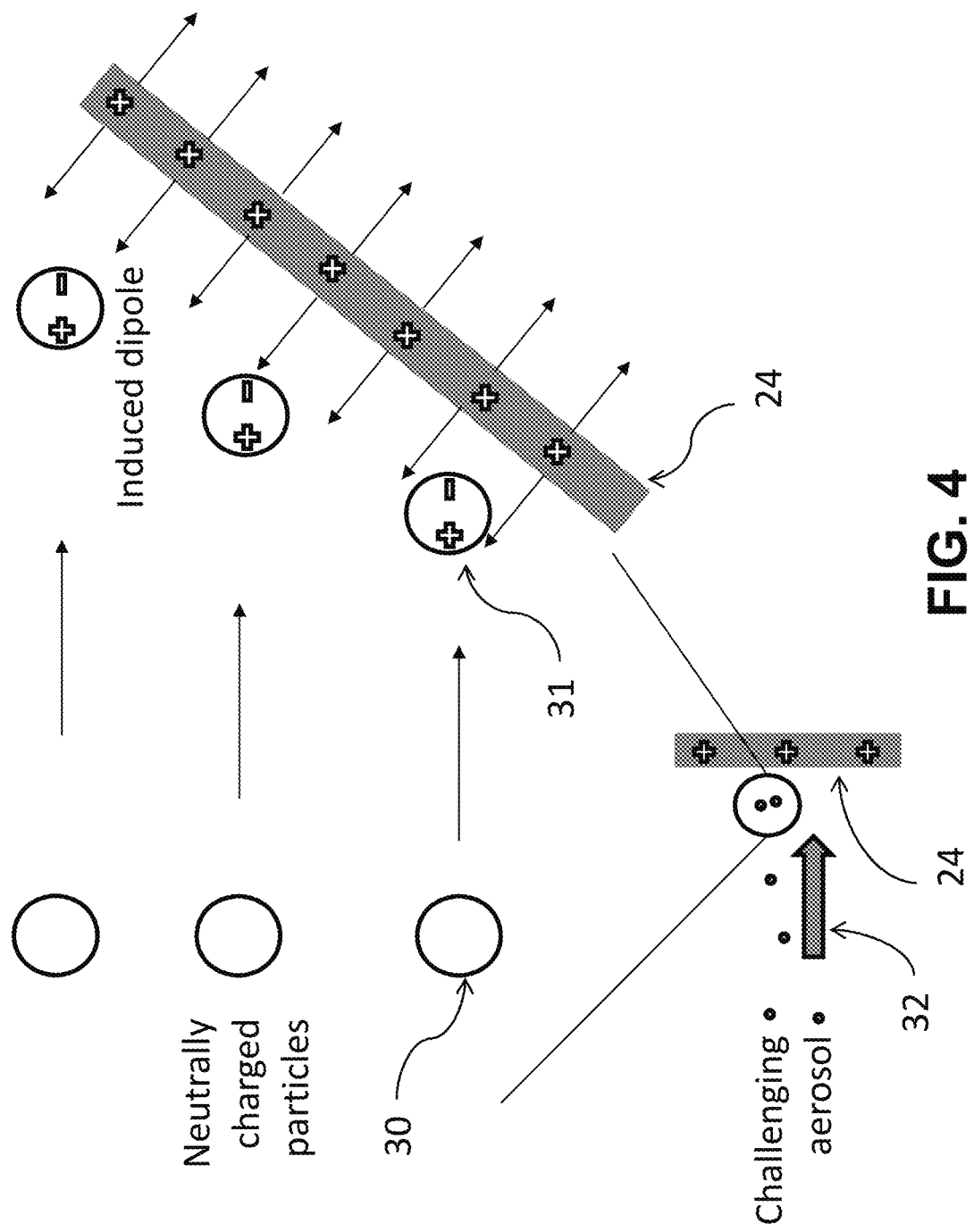
FIG. 4 depicts a drawing showing the electrostatic interaction of the charged multilayer nanofiber filter of FIG. 3, which induces dipoles on the neutrally charged particles.

FIG. 4 illustrates the electrostatic interaction of the charged multilayer nanofiber filter 24. When a challenging aerosol is carried by the air flow 32 travelling largely perpendicular to and passing through the charged multilayer nanofiber filter 24, the neutral charged particles 30 flow towards and in proximity to the charged multilayer nanofiber filter 24, an electric dipole is induced in each of the neutral charged particles 30 to obtain charged particles 31. Given that the particles are originally neutrally charged, the charges induced are due to electrostatic effect, and more precisely by dielectrophoretic effect or simply induction. As explained in equation (2), the strength of the dipole depends on the quantity of charges and the distance between the positive and negative charges. The distance between the positive and negative charges is higher for large particles, while the distance is smaller for small particles. Consequently, a large particle has a stronger dipole than a small particle.

As the charged particle 31 is getting close to the charged multilayer nanofiber filter 24, the many thinner layers of charged nanofiber mats 23 that make up the charged multilayer nanofiber filter 24 interact electrostatically with the charged particles 31. The electrical mechanism is found to be enhanced by dividing the single-layer of charged nanofiber mat 23 with high packing density into a charged multilayer nanofiber filter 24 with fewer fibers in each layer to reduce interference and overlapping electrical fields. By comparing the filtration efficiency of different filter configurations, where each filter is electrostatically charged in the same manner, it is possible to identify the filter configuration that can yield better performance with higher filtration efficiency due to induction and attraction from the dipole effect.

The aerosol filtration performance of filters was evaluated with a monodisperse sub-micrometer generation system (SMAG System, A&P, HK) and a customized filtration testing unit. Tests were conducted at the atmospheric pressure where a rotary vane vacuum pump was used to pull air through the system. The test aerosols were sodium chloride particles (NaCl, 50-500 nm) generated from atomizing NaCl solution with a constant output atomizer. The polydisperse aerosols subsequently was sucked into a neutralizer, a differential mobility analyzer (DMA) and a second neutralizer to get particles with a certain monodispersed size controlled by DMA voltage and in electrostatic charge equilibrium. The neutralized monodisperse NaCl aerosols were fed into a column filter holder with a diameter of 7.0 cm and an effective area of 38.5 cm² and down through the filter which was covered by a PP substrate to protect the PVDF layer from abrasion. The filter samples were tested at the flow rate of 12.24 L/min, representing the face velocity of 5.3 cm/s. The system flow rate was measured with a mass flow meter (Model 4100, TSI Inc., Shoreview, Minn., USA) at the inlet of the filter test system and a make-up air source was used to meet the required flow rate. Aerosols were extracted isokinetically with sampling probes upstream and downstream of the filter to a condensation particle counter (CPC, Model 3010, TSI Inc., Shoreview, Minn., USA) which was used to measure aerosol concentrations. The pressure drop ($\Delta P$) across the filters was measured using a digital pressure manometer (Model 2080P, Digitron, Elektron Technology, UK) at two points located immediately upstream and downstream of the filter. For the filtration tests of charged filters, the experiments were conducted 24 hours after the corona discharge treatment to get relatively stable amount of charge and filter performance.

Single Fiber Efficiency from Dielectrophoretic Effect

The filtration efficiency can be calculated based on the following equation:

$$\eta = \frac{C_{up} - C_{down}}{C_{up}} \times 100\% \quad (5)$$

where $C_{up}$ and $C_{down}$ denote the aerosol number concentrations of the upstream and the downstream, respectively.

The pressure drop from a fibrous filter is given by the Davis equation:

$$\frac{\Delta p d_f^2}{4\mu U z} = 16\alpha^{3/2}(1 + 56\alpha^3) \approx 16\alpha^{3/2} \quad (6)$$

The approximation made in Equation (6) can be justified provided $\alpha \ll (1/56)^{1/3}$, or $\alpha \ll 0.26$. Otherwise, we have to solve Equation (6) numerically, which can still be done relatively easily. By combining Equations (4) and (6), we can express $\alpha$ independent of the filter thickness Z as follows:

$$\alpha = \left(\frac{\Delta p d_f^2 \rho_s}{64\mu U W}\right)^2 \quad (7)$$

If the approximation $\alpha \ll 0.26$ is not used, then the numerical solution on $\alpha$ is required, that replaces Equation (5). The filter efficiency $\eta_F$ is related to the single-fiber efficiency $\eta_s$ by:

$$\eta_F = 1 - \exp\left[-\frac{4\alpha \eta_s Z}{\pi(1-\alpha)d_f}\right] \quad (8)$$

Based on this, we can express the single-fiber efficiency in terms of the filter efficiency, thus:

$$\eta_s = \frac{\pi(1-\alpha)d_f \rho_s}{4W} \ln\left[\frac{1}{1-\eta_F}\right] \quad (9)$$

If n similar modular filters, each with efficiency of $\eta_F$, are stacked to produce a composite filter with overall efficiency of $\eta_{F,n}$, thus:

$$\eta_{F,n} = 1 - (1-\eta_F)^n \quad (10)$$

The filter efficiency of the basic module, $\eta_F$, can be determined if we know $\eta_{F,n}$, $$\eta_F = 1 - (1-\eta_{F,n})^{1/n} \quad (11)$$

Based on Equation (11), we can thus determine the efficiency of the modular filter in composite filter with n modules, such as 2, 4, 6, and 8 in the present disclosure. Further from the modular filter, $\eta_F$, the single-fiber efficiency $\eta_s$ can be determined via Equation (9) with known values of $\alpha$ as determined from Equation (7), $d_f$ (average fiber diameter as determined from measurements of SEM), W (weight basis of nanofibers per m² filter). We can subsequently determine the single-fiber efficiency corresponding to both the mechanical filter, $(\eta_s)_m$ and the single-fiber efficiency of both the electret media filter $(\eta_s)_{m+o}$ consisting of both mechanical and dielectrophoretic capture mechanisms. Given the mechanical and dielectrophoretic capture mechanisms are independent and additive, the efficiency due to dielectrophoretic capture mechanism alone $(\eta_s)_o$ is simply as:

$$(\eta_s)_o = (\eta_s)_{m+o} - (\eta_s)_m \quad (12)$$

From the foregoing, in order to determine the dielectrophoretic efficiency for a single fiber in the filter, we need to carry out two sets of experiments under similar operating condition, one for which the aerosol capture is purely mechanical (diffusion and interception), while the other being mechanical plus dielectrophoretic effect. In the experiment, the former corresponds to our test filter dipped in alcohol overnight to remove any residual charges from electrospinning, while the latter corresponds to our test filter after being charged by corona discharge and left under equilibrium for a day. Further, it has been demonstrated that:

$$(\eta_s)_o = C' N_{po}^{0.4} \quad (13)$$

where $$N_{po} = \frac{2}{3}\frac{K_p - 1}{K_p + 2}\frac{C(\sigma d_p)^2}{\varepsilon_o(1+K_f)^2 d_f \mu U}; \text{ and} \quad (14)$$

$\varepsilon_o$ is the permittivity of free space and the Cunningham slip factor C is calculated from the following equation:

$$C(d_p) = 1 + 2.49(65/d_p) + 0.84(65/d_p)\exp\left[\frac{-0.43}{(65/d_p)}\right] \quad (15)$$

Assuming $\sigma$ the fiber surface charge density, $K_p$ the particle dielectric constant, $K_f$ the fiber dielectric constant are all constants [15c]. C is the Cunningham slip factor that depends on the aerosol size $d_p$; correction is required when $d_p$ is nearly 65 nm, the mean free path of air at Standard Temperature Pressure (STP), thus for a filter with given $d_f$ filtering gas at a fixed temperature, we can obtain:

$$N_{po} \propto \frac{C(d_p)^2}{U} \quad (16)$$

By substituting Equation (16) into Equation (13), we have:

$$(\eta_s)_o = G\left[\frac{c(d_p)^2}{U}\right]^{0.4} \quad (17)$$

where G is a constant.

As we can see from above, the filtration efficiency is made up of mechanical (diffusion and interception) and electrostatic/dielectrophoretic effect. From the test conducted respectively on charged filter (mechanical and electrostatic) and uncharged (mechanical) filter, the effect as a result of the electrostatic (dielectrophoretic) component can be identified accordingly as the basis for determining the performance of the filters.

Results

Figure 5:
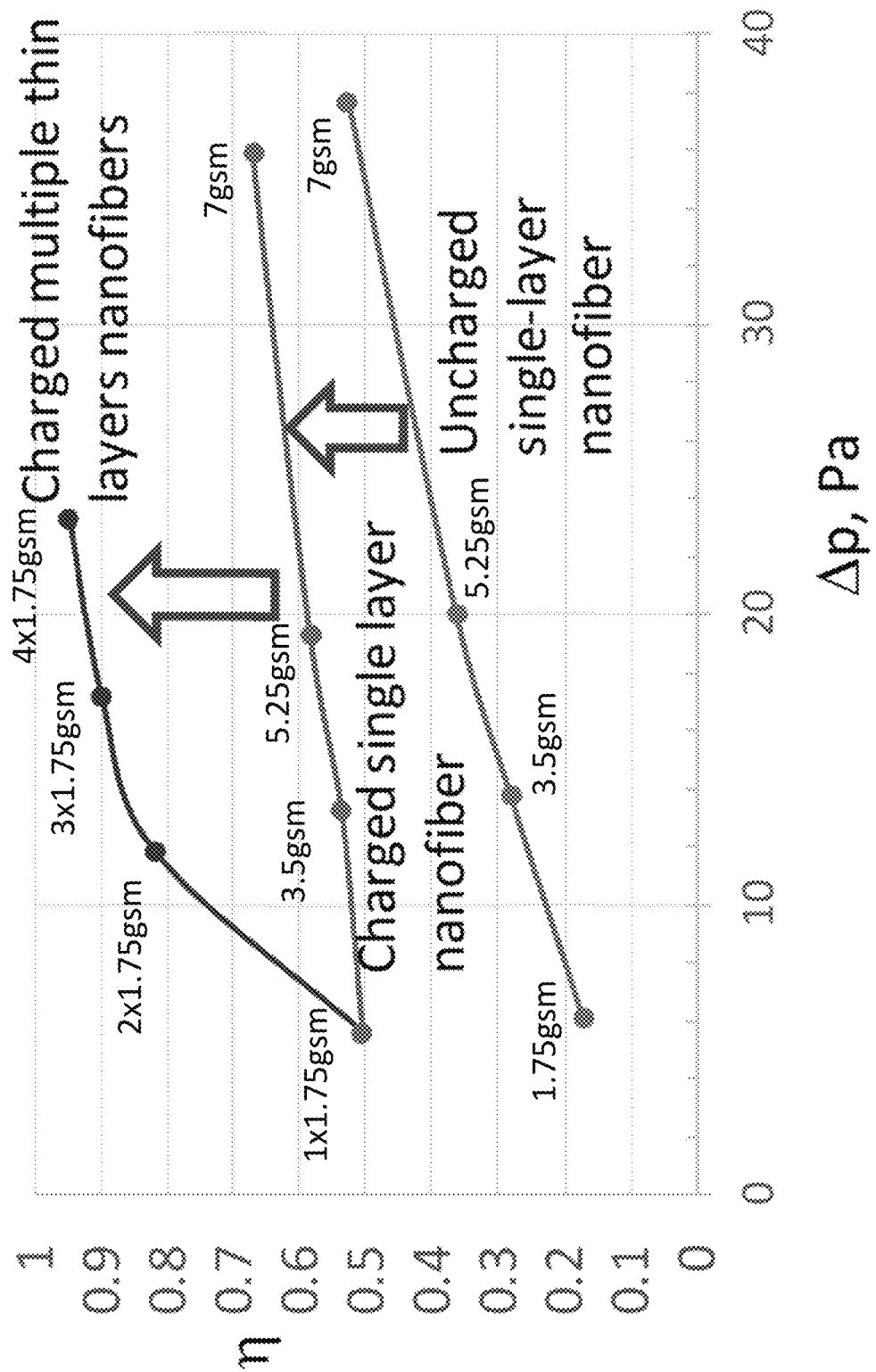
FIG. 5 is a graph showing the capture efficiency of 3 filter arrangements, including an arrangement of uncharged nanofiber and two arrangements of charged nanofibers.
Figure 6:
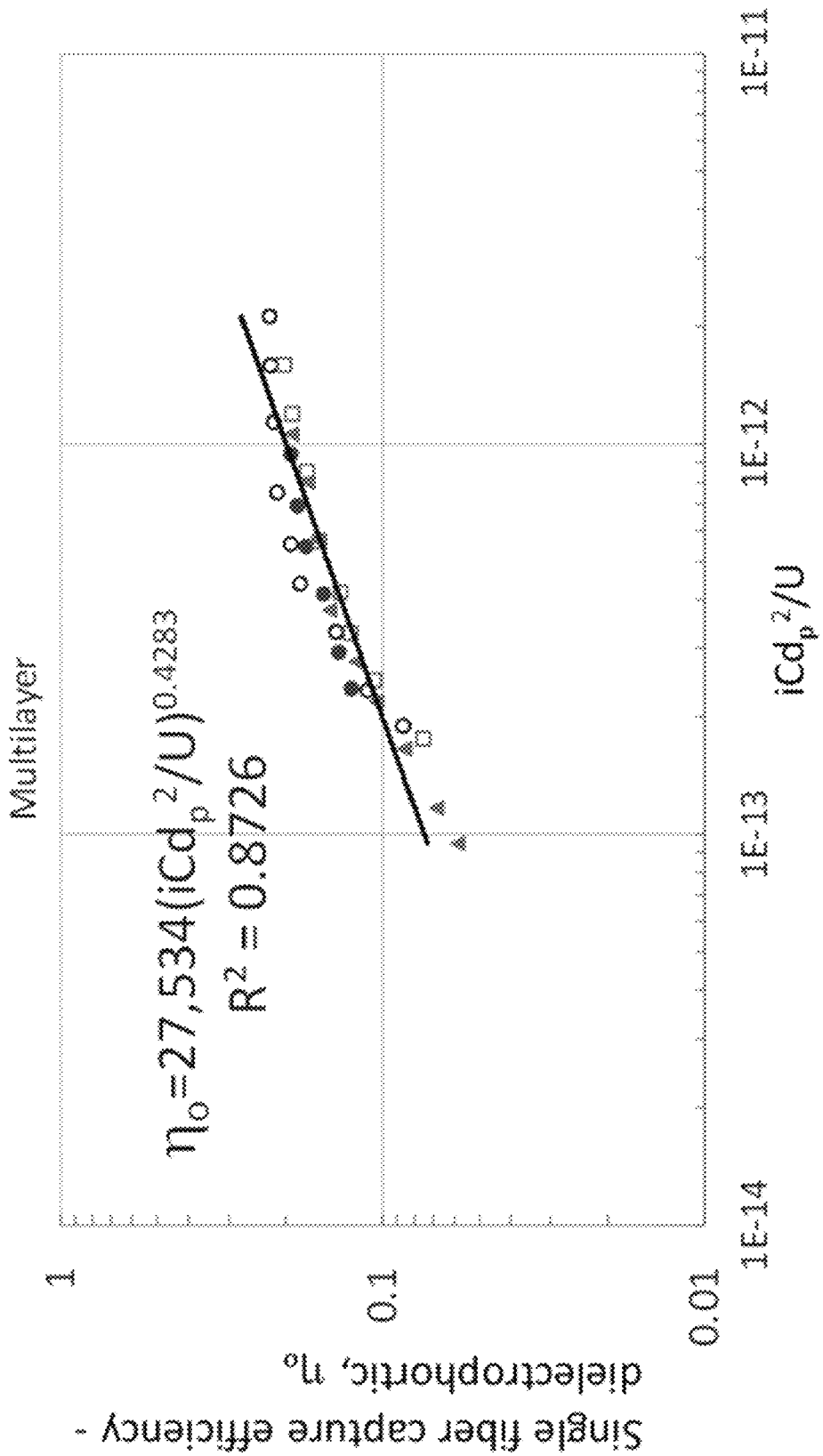
FIG. 6 is a graph showing the single fiber capture efficiency based on dielectrophoretic effect for various normalized multilayer nanofiber configurations.
Figure 7:
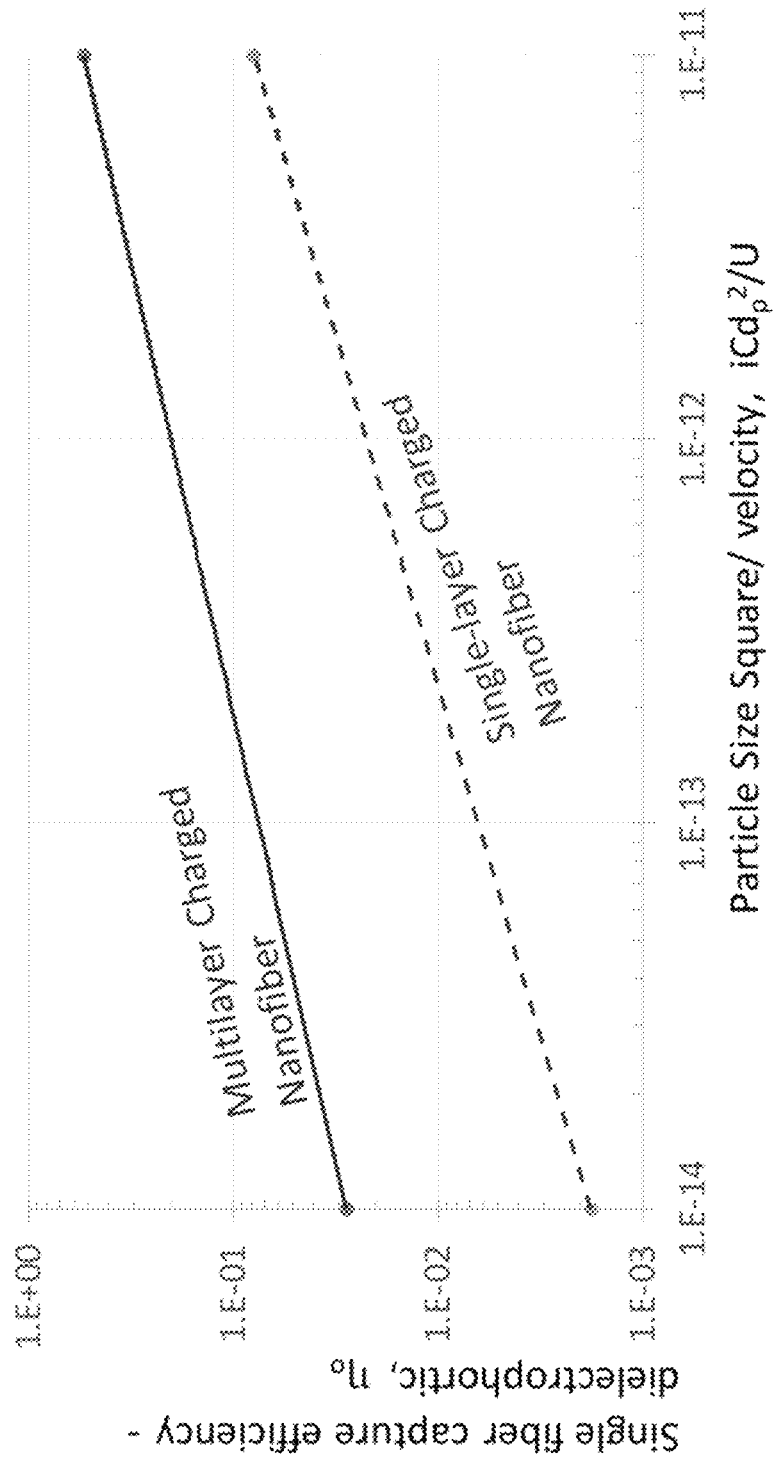
FIG. 7 is a graph showing the comparison on the single fiber capture efficiency based on dielectrophoretic effect between a single layer of charged nanofiber and multiple layers of charged nanofiber.

As shown in FIGS. 5-7, a charged multilayer nanofiber filter 24 has higher filtration efficiency from the dielectrophoretic effect than a charged single layer nanofiber, which in turn has higher filtration efficiency by dielectrophoretic effect than uncharged single layer nanofiber for the same gsm. FIG. 5 is a graph showing the filtration efficiency of three different arrangements of filters. The first arrangement is a nanofiber mat 22 (uncharged) having a single layer of nanofiber with increasing gsm from 1.75 to 7 gsm; the second arrangement is a charged nanofiber mat 23 having a single layer of nanofiber with increasing gsm from 1.75 to 7 gsm; and the third arrangement is a charged multilayer nanofiber filter 24 of the present disclosure, each thin layer is 1.75 gsm, with increasing gsm by stacking different number of layers together. From FIG. 5, the filtration efficiency of the charged multilayer nanofiber filter 24 of 1 to 4 layers is increased by a difference in a factor of approximately 2.0, 1.9, 1.5, and 0.8, respectively, when compared with the uncharged single layer of nanofiber mat 22 of the same GSM. Similarly, the pressure drop of the charged multilayer nanofiber filter 24 is reduced by approximately 1 to 10 Pa.

FIG. 6 shows the single fiber capture efficiency based on dielectrophoretic effect for various normalized charged multilayer nanofiber filter 24 configurations.

Referring to FIG. 7, with the fixed amount of fibers, i.e. fixed total gsm, the single fiber capture efficiency based on dielectrophoretic effect is significantly higher for a charged multilayer nanofiber than a charged single layer nanofiber. Further, increasing particle size and decreasing the face velocity can result in a longer particle retention time, benefiting from the higher single fiber capture efficiency.

Figure 8:
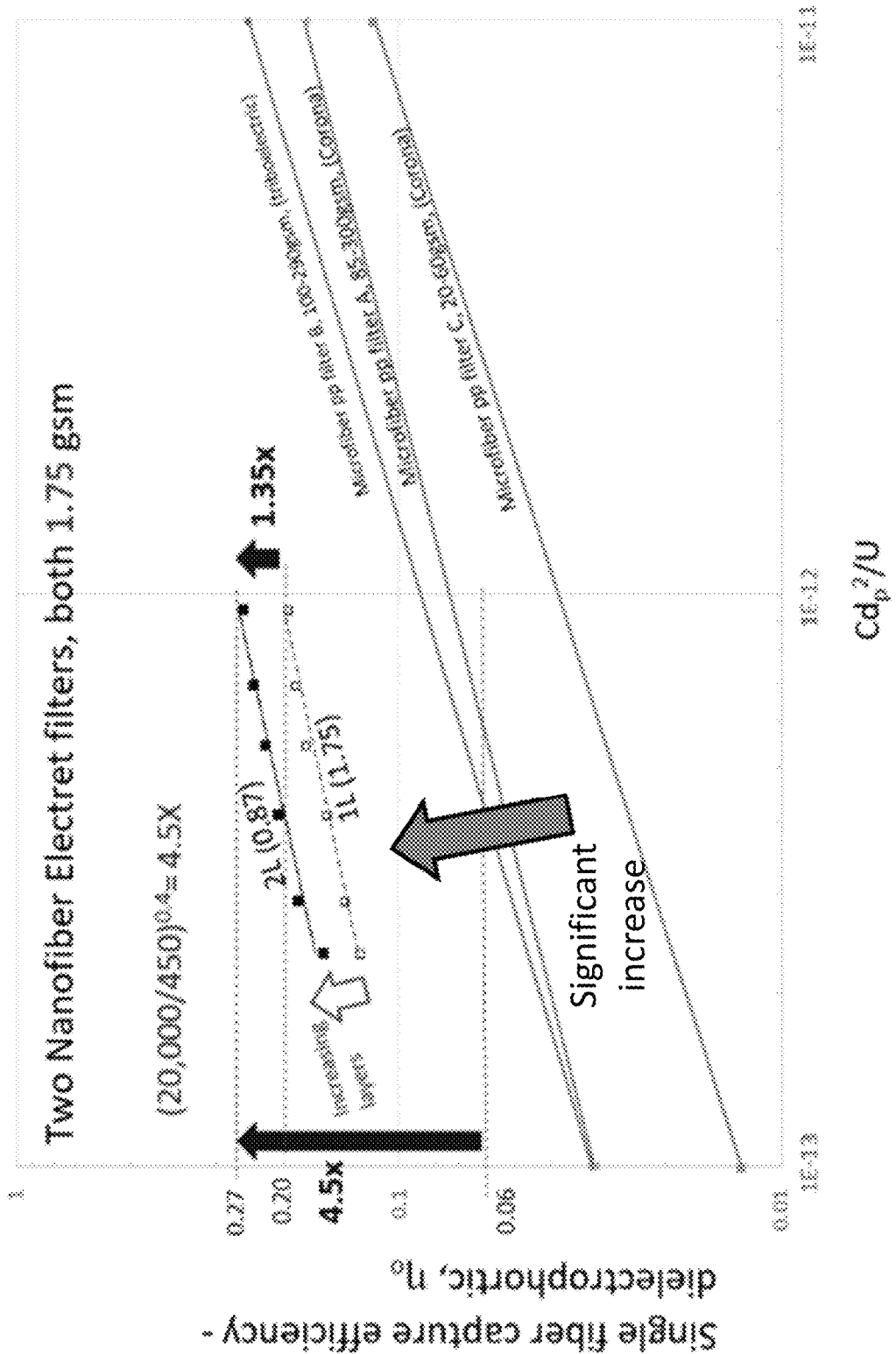
FIG. 8 is a graph showing the comparison on the single fiber capture efficiency based on dielectrophoretic effect between two charged nanofiber (Polyvinylidene fluoride) filters of one and two layers, and an assortment of microfiber (polypropylene) filters with different gsm and charging methods (corona discharge and triboelectric effect).

FIG. 8 shows a log-log plot of single-fiber efficiency based on dielectrophoretic effect versus $Cd_p^2/U$ per Equation (17). There are two sets of data. The lower set corresponds to the correlation on three different microfiber-based filters respectively, filter A with 85-300 gsm and electrostatically charged by Corona discharge, filter B with 100-290 gsm fibers and charged by triboelectric effect, and filter C with 20-60 gsm and charged by Corona discharge. The correlations are based on a large data set carried out earlier on commercially available filters, made of melt-blown polypropylene material. The upper set contains our test results cast in similar format on the log-log plot. The lower curve (appeared as straight line on log-log graph) represents one single layer with 1.75 gsm PVDF nanofibers, while the upper curve represents also 1.75 gsm but in form of two stack-up layers with each layer 0.87 gsm of PVDF nanofibers. Two observations have been made with the nanofiber test results.

The filtration efficiency for nanofiber with diameter of 450 nm is much greater than that of microfiber with diameter of 2 micron. For particle with size corresponding to $Cd_p^2/u=1\times10^{-12}$, the filtration efficiency for the nanofiber is 4.5 times higher than that of the microfiber. The filtration efficiency is further increased by 1.35 times by using two layers of thinner nanofiber instead of a single layer of nanofiber.

It is also noted that when $Cd_p^2/U$ is $1\times10^{-12}$ m-s, taking the microfiber filter $\eta_o$ being 0.06 and the nanofiber filter (double layer) $\eta_o$ being 0.27, their ratio is 4.5. Given that the single-fiber efficiency based on dielectrophoretic effect, Equations (13) and (14), varies inversely as fiber diameter to the power of 0.4, therefore, we can obtain:

$$\frac{(\eta_o)_{nano}}{(\eta_o)_{micro}} = \left[\frac{(d_f)_{micro}}{(d_f)_{nano}}\right]^{0.4} = \left[\frac{20,000}{450}\right]^{0.4} = 4.5 \quad (18)$$

Figure 10:
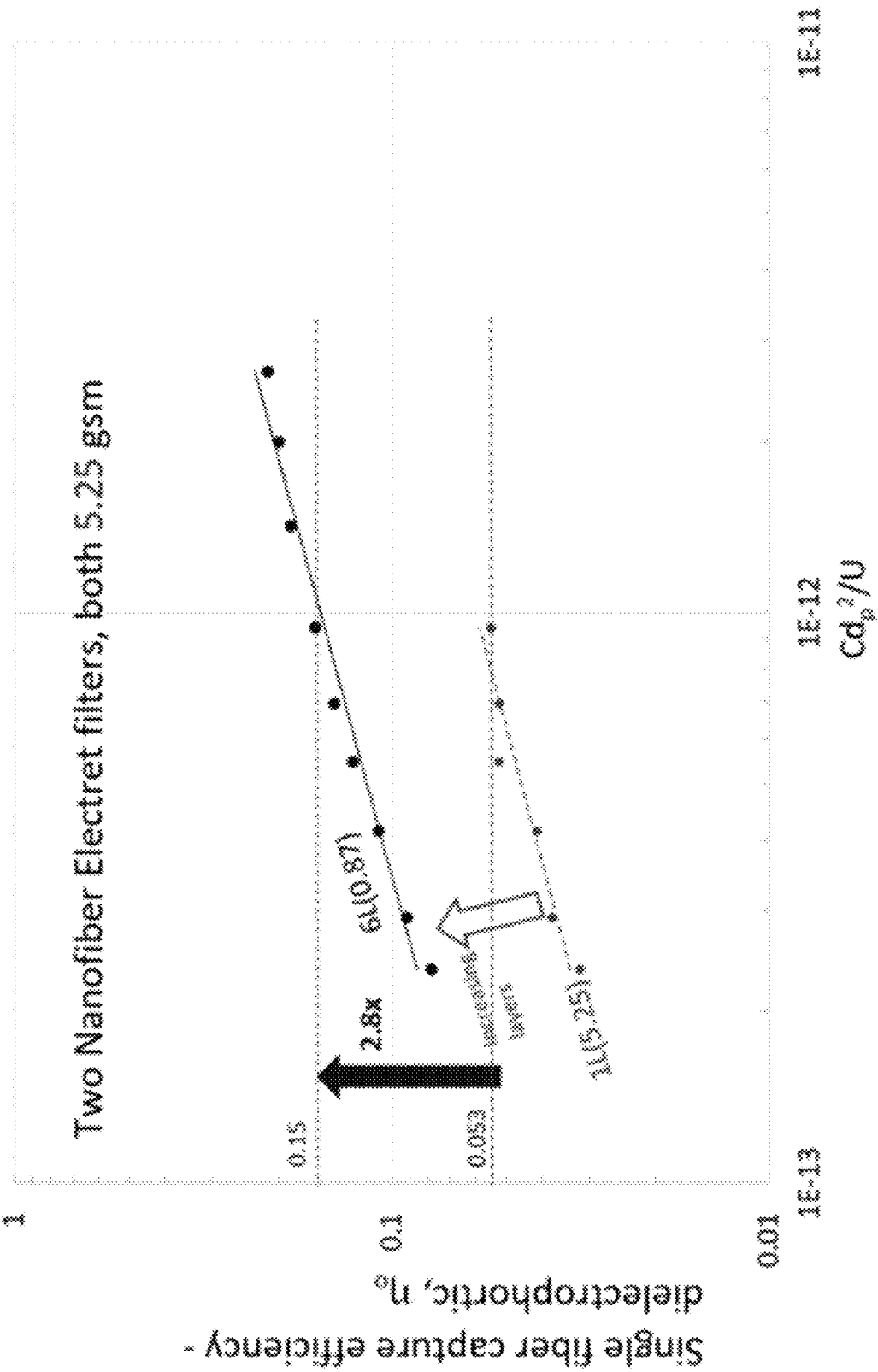
FIG. 10 is a graph showing the comparison on the single fiber capture efficiency based on dielectrophoretic effect between two nanofiber electret filters with 5.25 gsm, one has single layer and the other has 6 layers.
Figure 11:
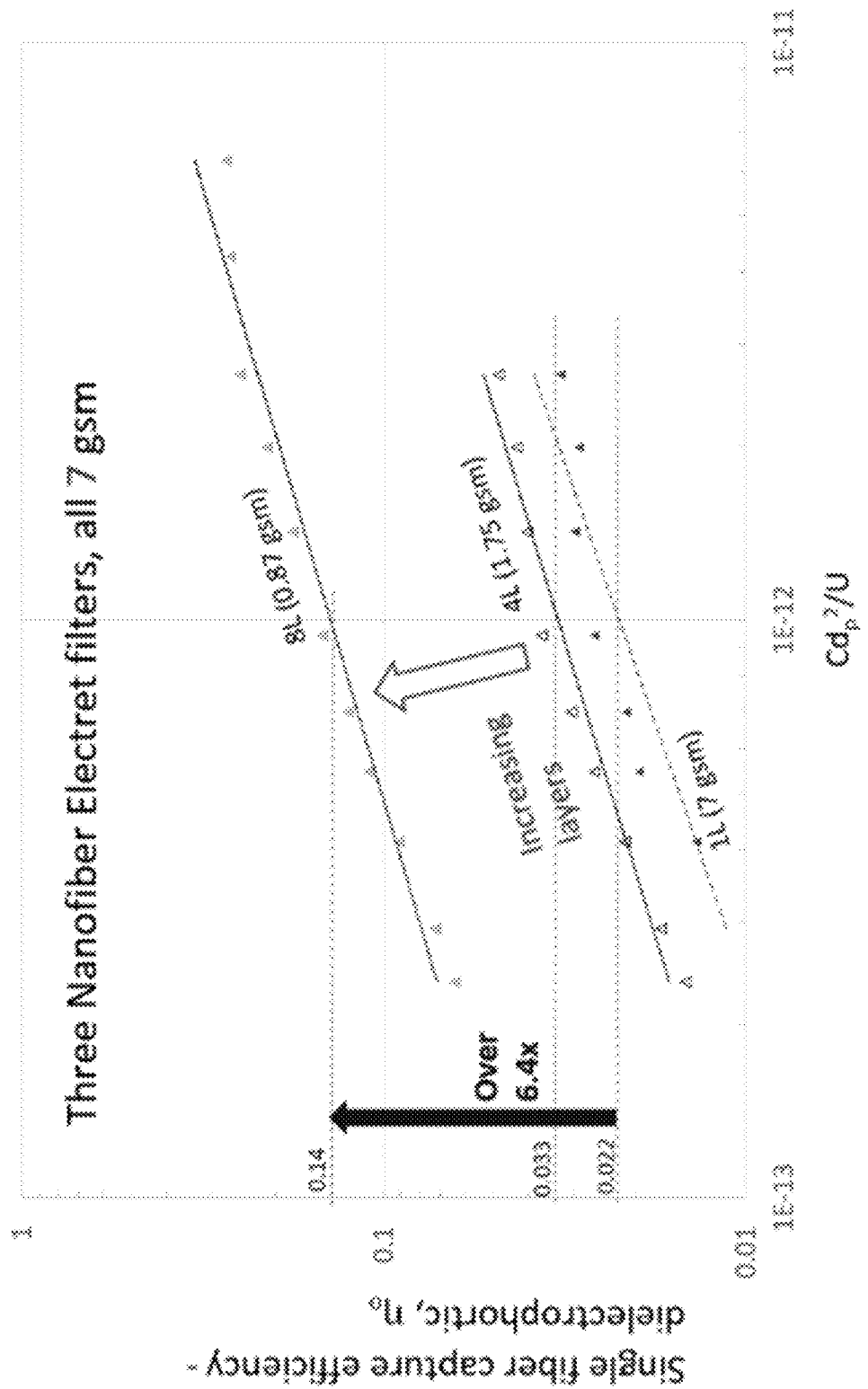
FIG. 11 is a graph showing the comparison on the single fiber capture efficiency based on dielectrophoretic effect between 3 nanofiber electret filters all with 7 gsm, first filter has single layer, second filter has 4 layers, and third filter has 8 layers.

This is in accord with the experimental ratio of 4.5 times as determined. By further comparing the single fiber dielectrophoretic efficiency between the 6 L (0.87) with the 1 L (5.25) in FIG. 10, the multilayer is better by a factor of 2.8X at $Cd_p^2/U=1\times10^{-12}$ m-s.

Figure 9:
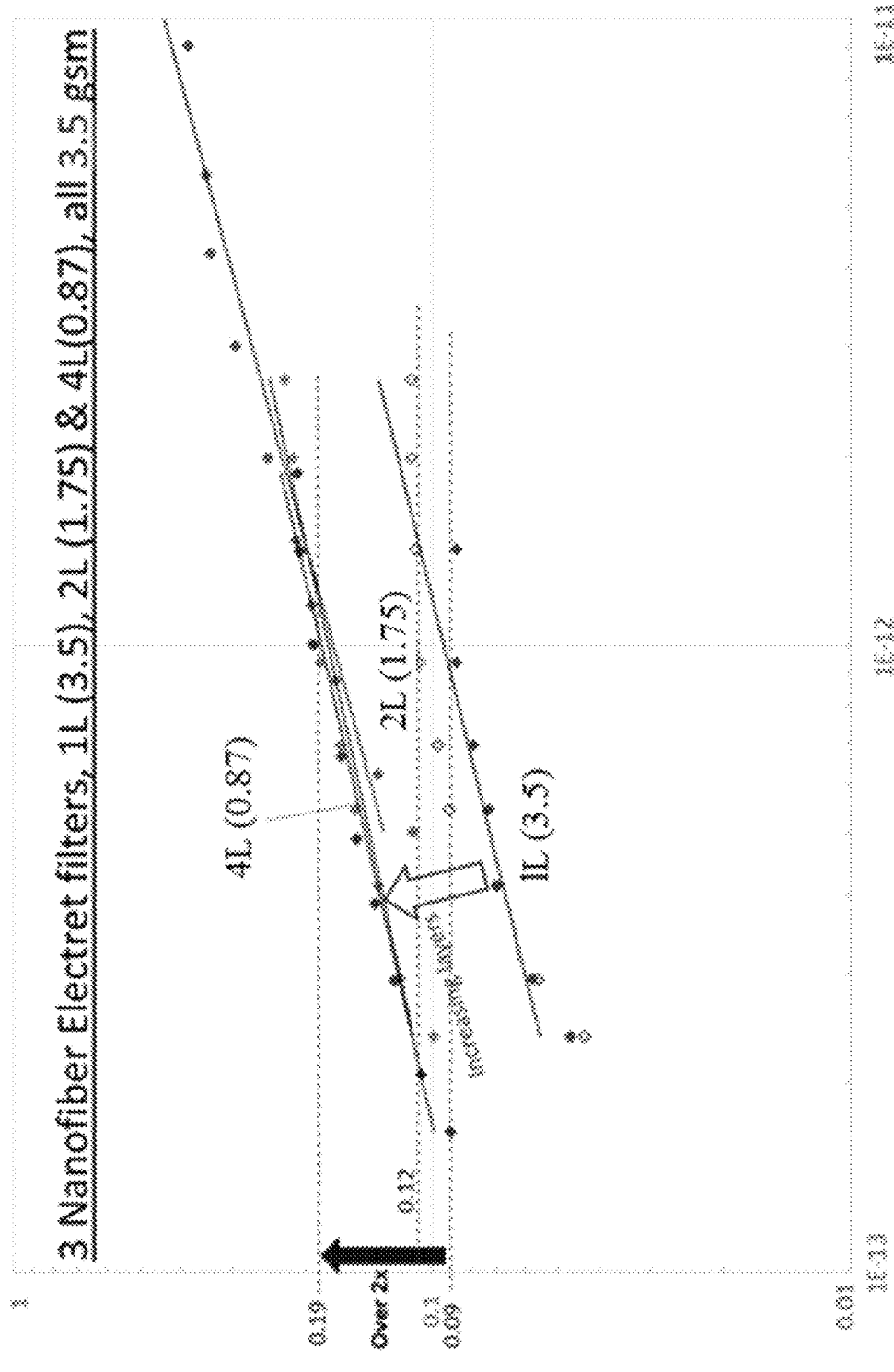
FIG. 9 is a graph showing the comparison on the single fiber capture efficiency based on dielectrophoretic effect between 3 nanofiber electret filters with 1 layer, 2 layers, and 4 layers all with 3.5 gsm at 5.3 cm/s challenging velocity. The 4 layers also include face velocities of 2.5 and 7.5 cm/s, respectively.

FIG. 9 illustrates the effect of aerosol diameter (50 to 400 nm) and face velocity effect (2.5, 5.3, and 7.5 cm/s). All the results are well correlated on a single trend in agreement with Equation (17), as follow:

$$\eta_o \propto \left[\frac{C(d_p)^2}{U}\right]^n \quad (19)$$

wherein n varying between 0.327 to 0.405.

The result from Equation (19) is comparable to the theoretical power index of 0.4 in Equation (17). The effect due to increasing face velocity (shorter retention time) with resulting lower single-fiber capture efficiency from dielectrophoretic effect is clearly evident; vice versa for lower challenging face velocity or longer retention time.

Another advantage of the charged multilayer nanofiber filter 24 is observed when comparing a 4 layer (each layer 0.87) of nanofiber with a single nanofiber layer with 3.5 gsm in FIG. 9. It is noted that the single fiber capture efficiency based on dielectrophoretic effect is higher. Given the lines are parallel, we can take a given value of the abscissa $Cd_p^2/U=1\times(10^{-12})$m-s, the $\eta_o$ for the 4 L is 0.19 while the 1 L is 0.085, the ratio being 2.2. This ratio is the same across all sizes. Based on the Equation (17), we can obtain:

$$\eta_o = G\left[\frac{C(d_p)^2}{U}\right]^n \quad (20)$$

At $dp_1$, $$\eta_{o2} = G_2\left[\frac{C(d_{p1})^2}{U}\right]^n \quad (21)$$

For 4 L (0.87) and $$\eta_{o1} = G_1\left[\frac{C(d_{p1})^2}{U}\right]^n \quad (22)$$

For 1 L (3.5), taking the ratio of Equation (22) and Equation (21), $$\frac{\eta_{o2}}{\eta_{o1}} = \frac{G_2}{G_1} \quad (23)$$

Therefore, the ratio in Equation (23) does not depend on the aerosol size. The slope of the two lines are the same or n for the two curves are nearly the same, then it does not matter where the efficiencies of the two are compared so long as they have the same abscissa value $Cd_p^2/U$. In the present case, for convenience we take $Cd_p^2/U=1 \times 10^{-12}$ m-s. In any case, using 4 layers is better than the single layer by 2.2X. This multilayer benefit is quite evident.

In reviewing FIGS. 8-11, it can be seen that as the basis weight (gsm) increases, the multilayer benefit seems to be much greater. The single fiber efficiencies of nanofiber filters with increasing gsm, 1.75, 3.5, 5.25 and 7 gsm, are compared to determine the impact to the single fiber capture efficiency by dielectrophoretic effect between a single layer of charged filter and a charged multilayer filter. The use of multilayer arrangement can provide better benefit in shielding the interference among the adjacent charged layer in the filter. The enhancements in single fiber capture efficiency based on dielectrophoretic effect of using 2, 4, 6 and 8 multilayer configurations are 1.35X, >2X, 2.8X, and >6.4X, respectively, as compared to a single layer with the same gsm. The performance on the enhancement is summarized in FIG. 12. From the table, it is apparent that more layers of nanofiber can enhance the performance.

Figure 13:
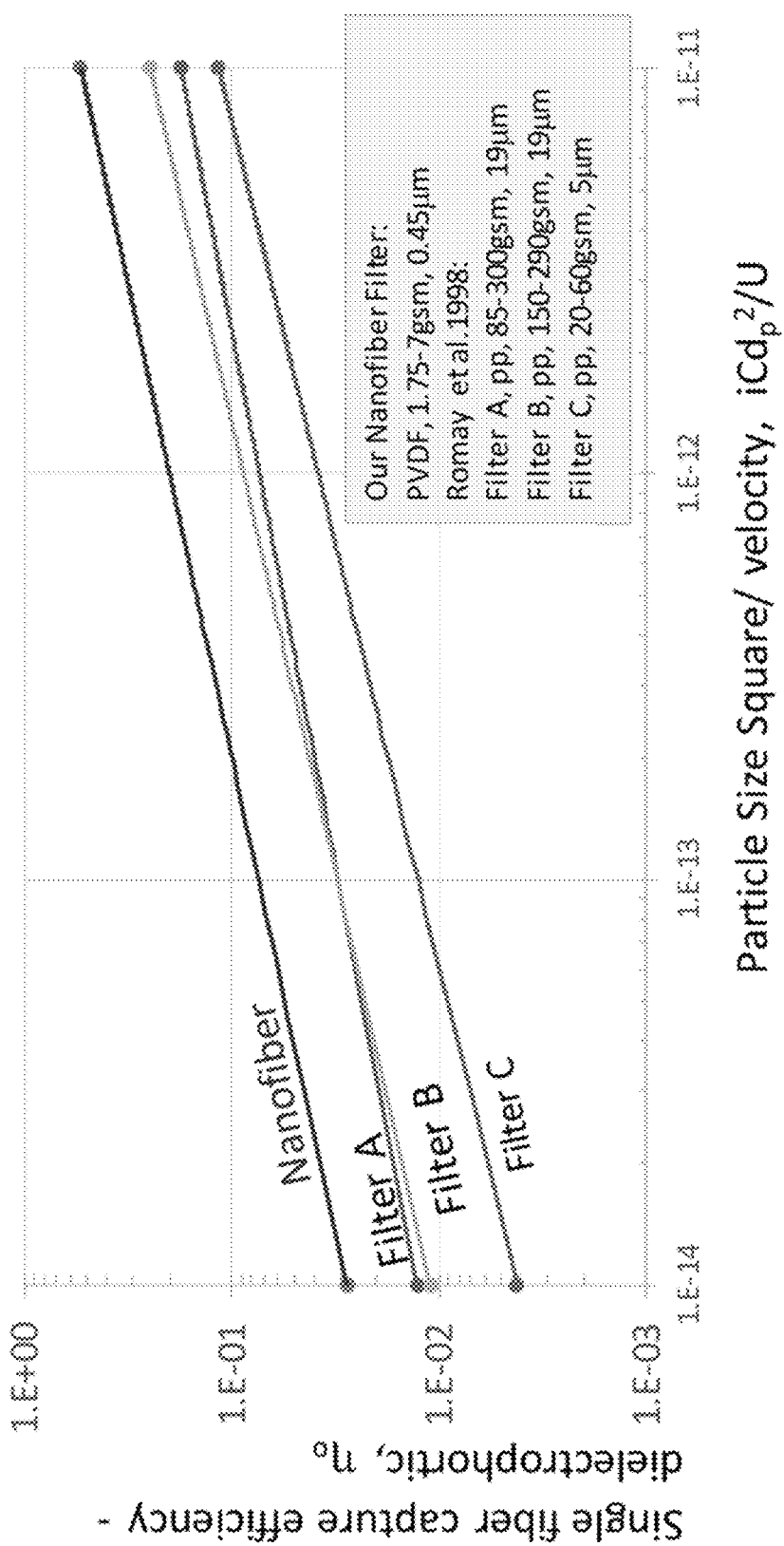
FIG. 13 is a graph showing the comparison on the single fiber capture efficiency based on dielectrophoretic effect between a nanofiber (Polyvinylidene fluoride) and three different microfiber filters.

As shown in FIG. 13, the charged multilayer nanofiber filter 24 of the present disclosure is compared with three other filters made of microfiber (PP) with thickness of 85-300 gsm (particle diameter of 19 μm), 150-290 gsm (particle diameter of 19 μm), and 20-60 gsm (particle diameter of 5 μm) respectively. From the result, the charged multilayer nanofiber filter 24 with the same total amount of fibers has significantly higher single fiber capture efficiency based on dielectrophoretic effect than the microfiber filters.

By using a charged multilayer nanofiber filter 24 with the same total amount of fibers, aerosol flow rate within the filter is lowered. Due to the layers are loosely packed, extra space is given to aerosol flow to resume its initial face velocity at the upstream of each layer, hence increasing the utilization rate of fibers. Apart from the increased filtration efficiency, stacking up multiple layers with high porosity also resulted in lower pressure drop. As shown in Table I, the measured pressure drop across M2-1.75-P, M3-1.75-P and M4-1.75-P are 12.4 Pa, 17.8 Pa and 24.1 Pa, respectively, which are approximately two, three and four times of that across S-1.75-P of 6.1 Pa. The pressure drop saving is more notable with higher basis weight, with a decrease of 1.4 Pa for M2-1.75-P in comparison with S-3.46-P while 13.6 Pa for M4-1.75-P compared with S-6.98-P. With higher filtration efficiency and lower pressure drop, higher QF can be reached for the charged multilayer nanofiber filter 24. As a departure from the single-layer filters, whose increase in filtration efficiency is overshadowed that of pressure drop leading to decreasing QF with GSM, QF of multi-layer filters is affected slightly by the number of layers and remained at relatively high values. This result conforms to the equation of QF which shows that composites formed by stacking up different numbers of identical layers have the same quality factor of the single layer. Contrary, the QF drops with increasing GSM for the single layer.

Figure 21A:
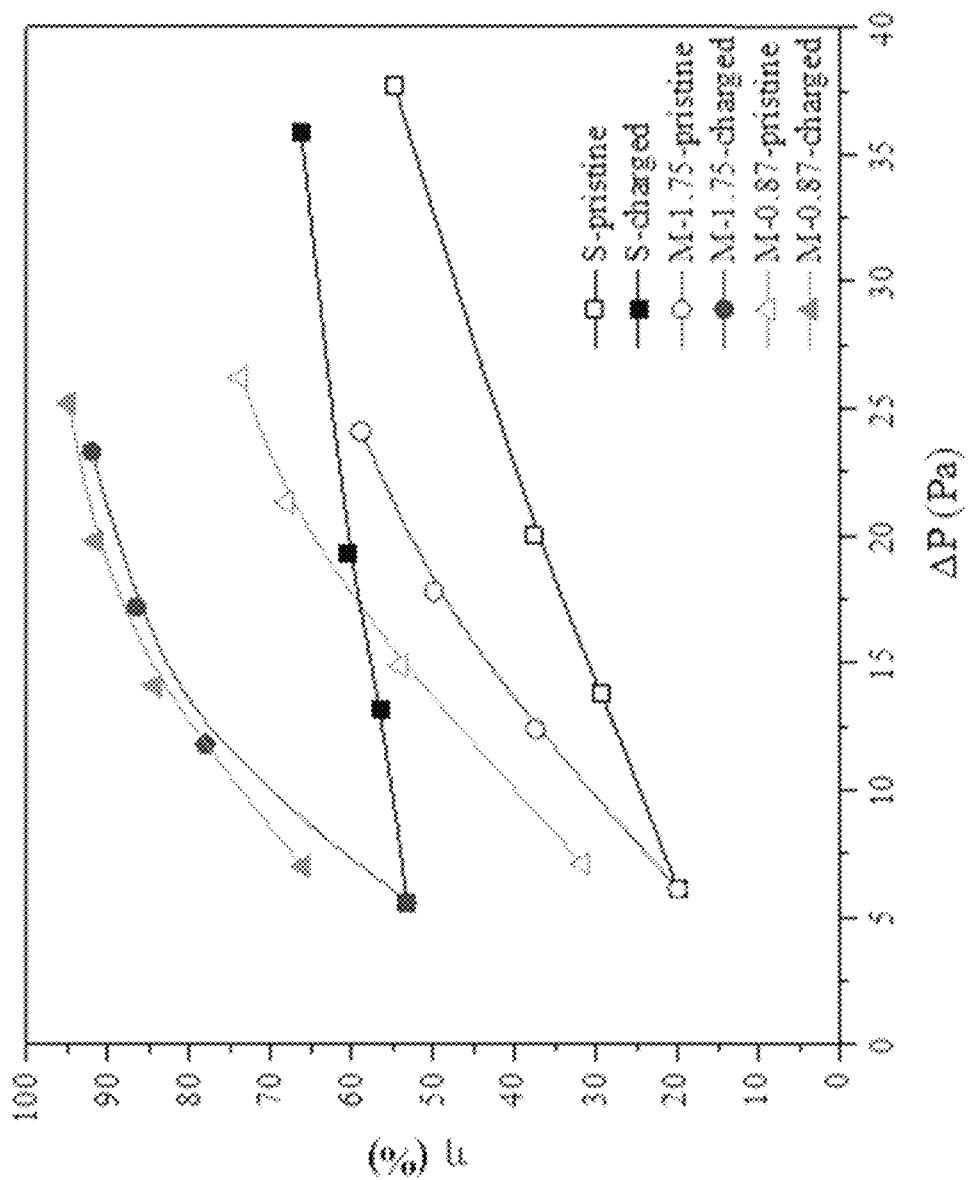
FIG. 21A is a graph showing the changes of the filtration efficiency of uncharged (pristine) and charged PVDF single-layer and multi-layer filters with corresponding pressure drop ($\Delta P$).
Figure 21B:
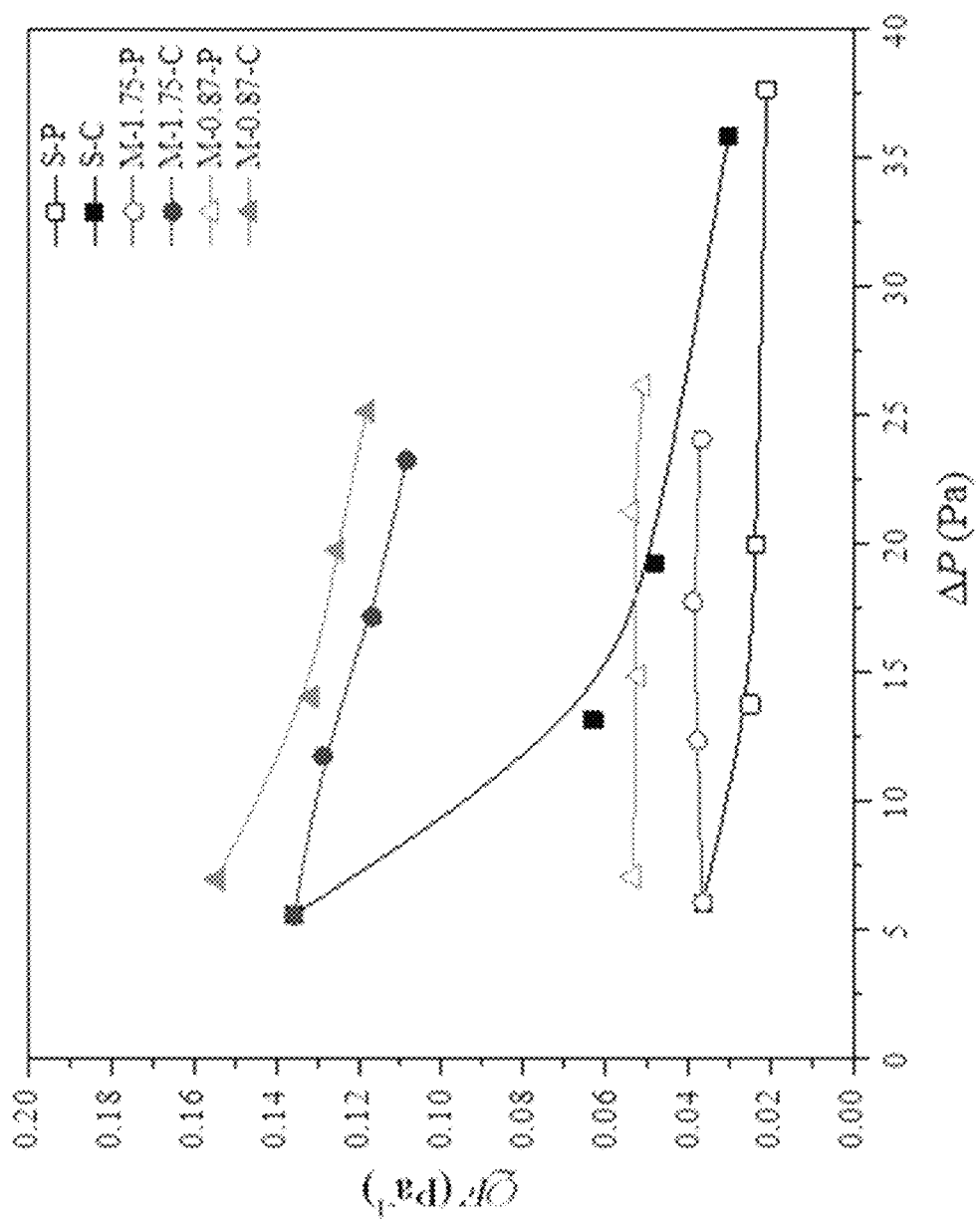
FIG. 21B is a graph showing the changes of the quality factors of uncharged (pristine) and charged PVDF single-layer and multi-layer filters with corresponding pressure drop (ΔP).
Figure 22A:
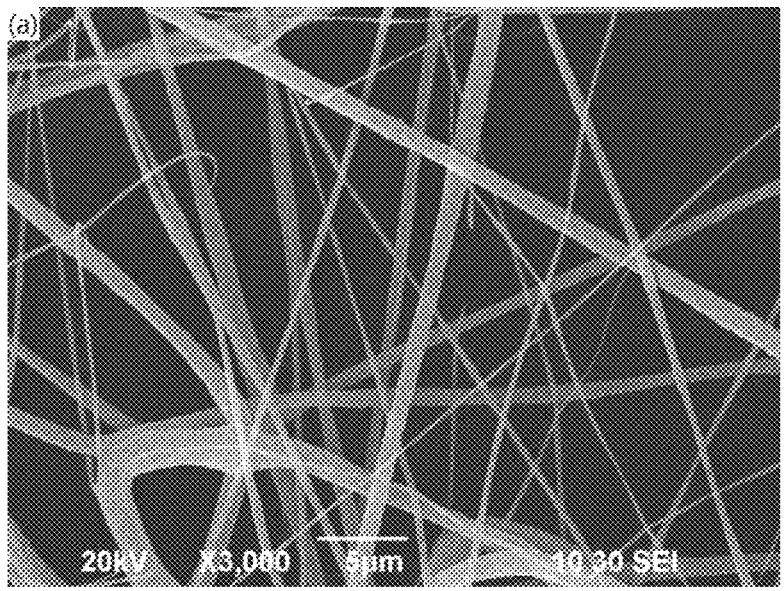
FIG. 22A is a scanning electron microscope (SEM) image showing the reticular structure of PVDF nanofiber filter of 0.87 gsm.
Figure 22B:
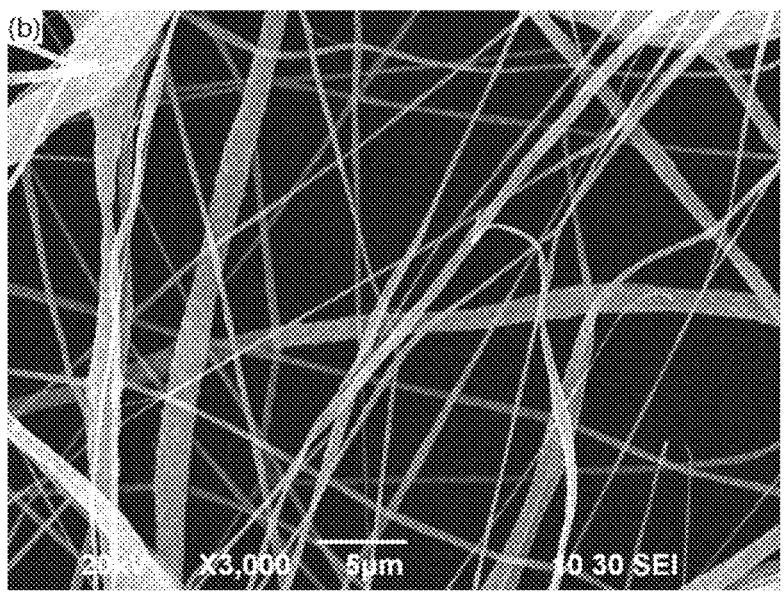
FIG. 22B is a SEM image showing the reticular structure of PVDF nanofiber filter of 1.75 gsm.
Figure 22C:
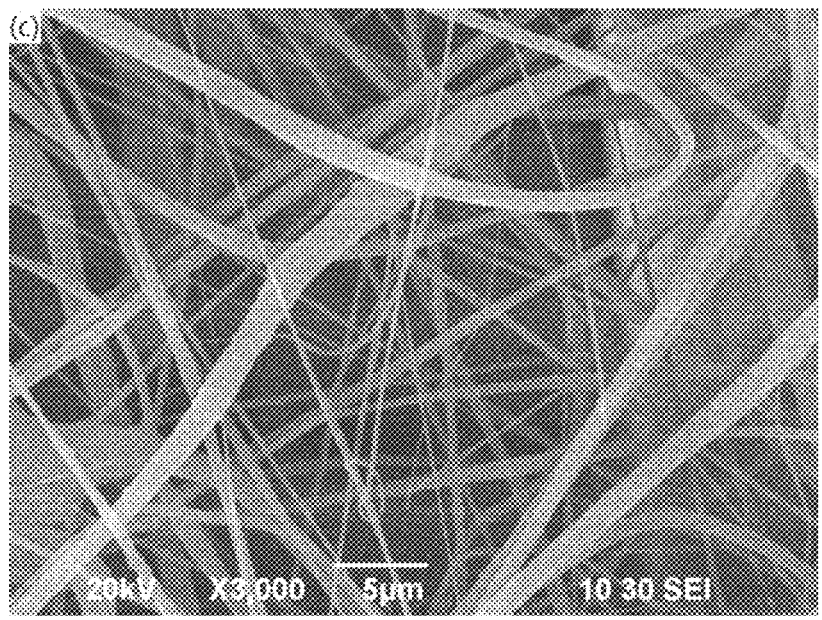
FIG. 22C is a SEM image showing the reticular structure of PVDF nanofiber filter of 3.46 gsm.
Figure 22D:
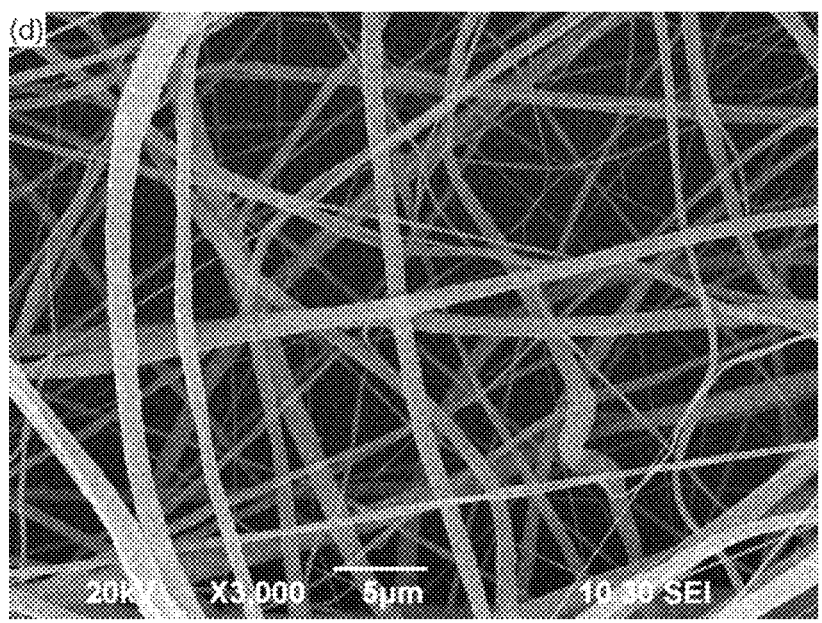
FIG. 22D is a SEM image showing the reticular structure of PVDF nanofiber filter of 5.10 gsm.
Figure 22E:
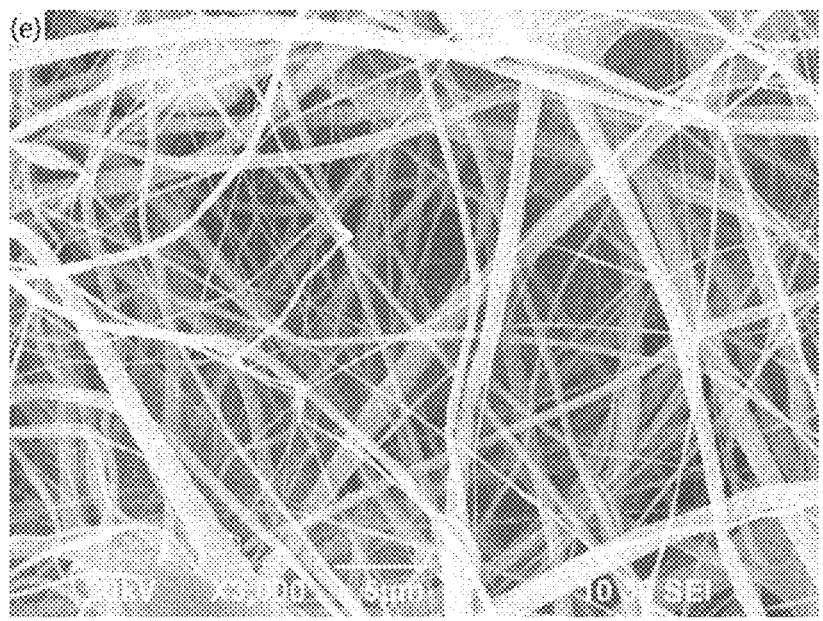
FIG. 22E is a SEM image showing the reticular structure of PVDF nanofiber filter of 6.98 gsm.

In order to show a clearer pattern of the effect of 'multi-layering', filtration efficiency and QF of 150-nm particles are plotted against the corresponding pressure drop, respectively, in FIG. 21A and FIG. 21B. From the figures, it is proved that filters with both high filtration efficiency and low pressure drop can be fabricated benefiting from separating fibers into more layers in a multiple layer arrangement.

Figure 15A:
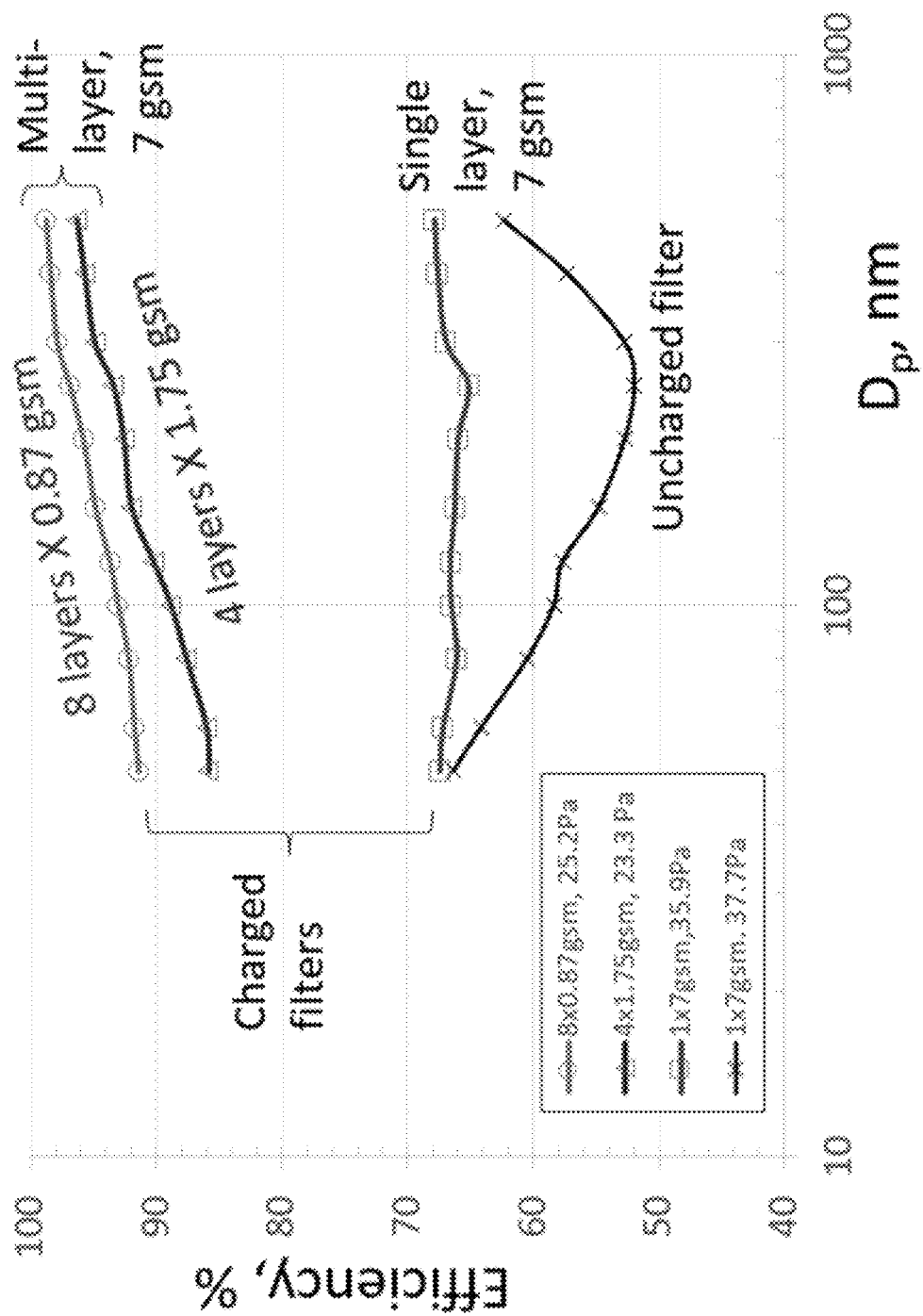
FIG. 15A is a graph showing the filtration efficiency of single layer (charged and uncharged) and multilayer nanofiber filters of 7 gsm with different particle sizes.

A direct comparison of four filter arrangements with 7 gsm of fibers is shown in FIG. 15A. The uncharged filter can capture aerosols by diffusion and interception. The characteristic V-shape efficiency curve is evident. When the filter is electrostatic charged, it gives higher efficiency but surprisingly the filtration efficiency is almost the same at 65-68% for all particle sizes. This is due to the electrostatic interference or interactions among the different sublayers in the filter as shown in FIG. 1A. When the filter is partitioned into multiple layers with each layer separated by polypropylene porous materials to shield the electrostatic interference between neighboring layers, as shown in FIG. 1B, the efficiency rises dramatically for 4 layers (1.75 gsm each) starting from 86% to 96.4%. Large particles have higher efficiency than smaller particles. It is in contrast with the filter when all the fibers are packed into a single layer. When the filter is further partitioned into 8 layers (0.87 gsm each), the efficiency is further increased. In certain situations, the efficiency can be as high as 99% with large particles.

Figure 15B:
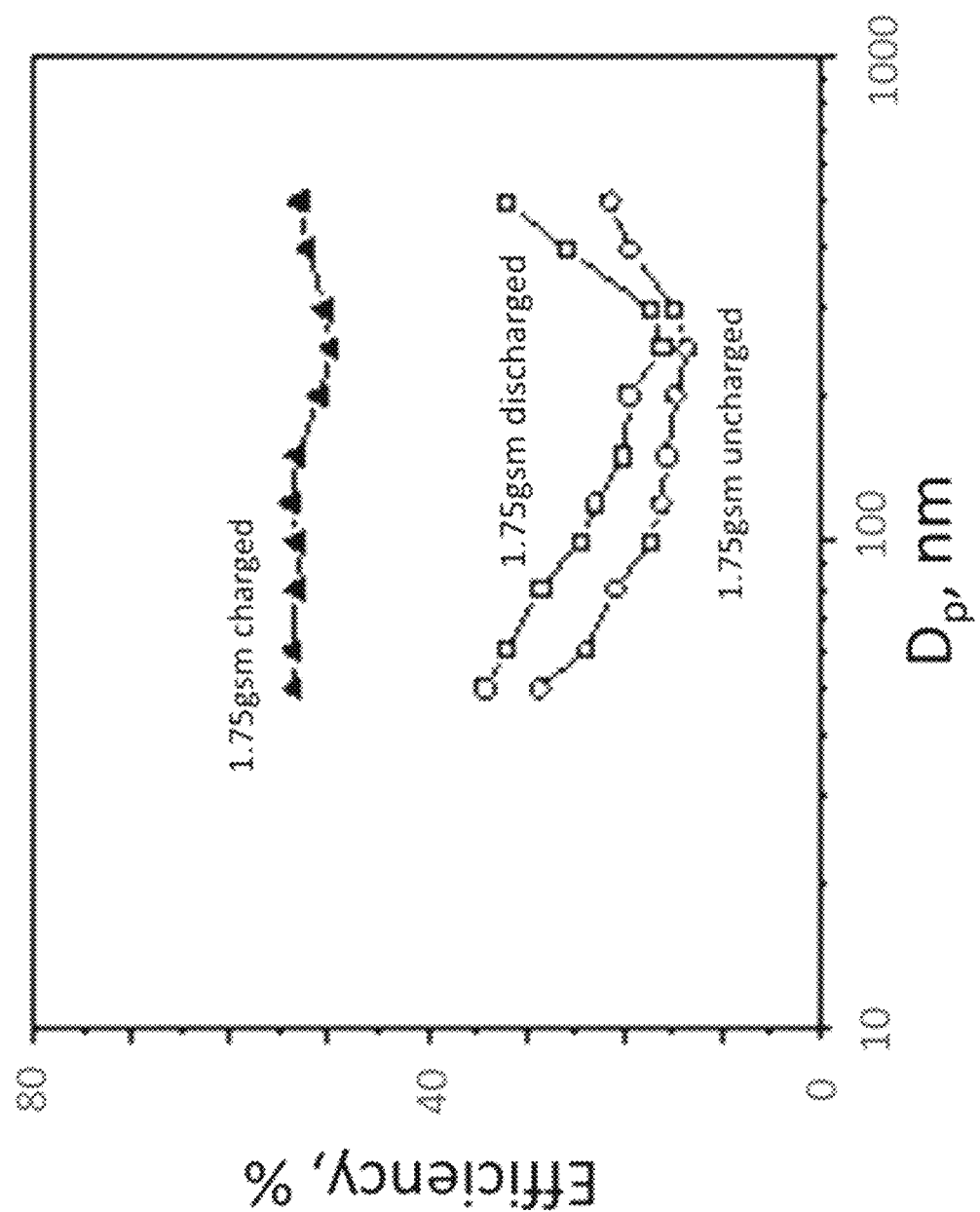
FIG. 15B is a graph showing the filtration efficiency of single layer of prestine (after electrospinning), charged and discharged nanofiber filters of 1.75 gsm.

FIG. 15B shows the filtration efficiency of PVDF filter (uncharged, charged and discharged) in different charging states for particles ranging from 50 nm to 500 nm. The uncharged (pristine) filter shows a typical 'V'-shape filtration curve with the most penetrating particle size (MPPS) at around 250 nm. This indicates that mechanical mechanism, mainly interception and diffusion, played a major role in aerosol filtration, which was further confirmed by the insignificant drop in filtration efficiency after eliminating the intrinsic charge on the pristine filter using IPA soaking method. When the filter is charged by corona discharge, the filtration efficiency for aerosols of all sizes was greatly increased from 16.1-34.2% to about 51.5% and the filtration curve became much more flattened due to the enhanced electrical attraction between charged fibers and polarized particles. The larger particles getting more benefit from the induced charges and dipoles. This in turn results in a higher efficiency. It is more apparent when analyzing the single-fiber efficiency from dielectrophoretic effect. The "residual" MPPS at 250 nm is attributed to the mixed effects of electrical and mechanical mechanisms.

The quality factor (Benefit-to-cost ratio, QF), is defined as:

$$QF = -\frac{\ln(1 - \eta_F)}{\Delta p} \quad (24)$$

where:

$\eta_F$ is the filter efficiency; and $\Delta p$ is the pressure drop across the filter.

Figure 16A:
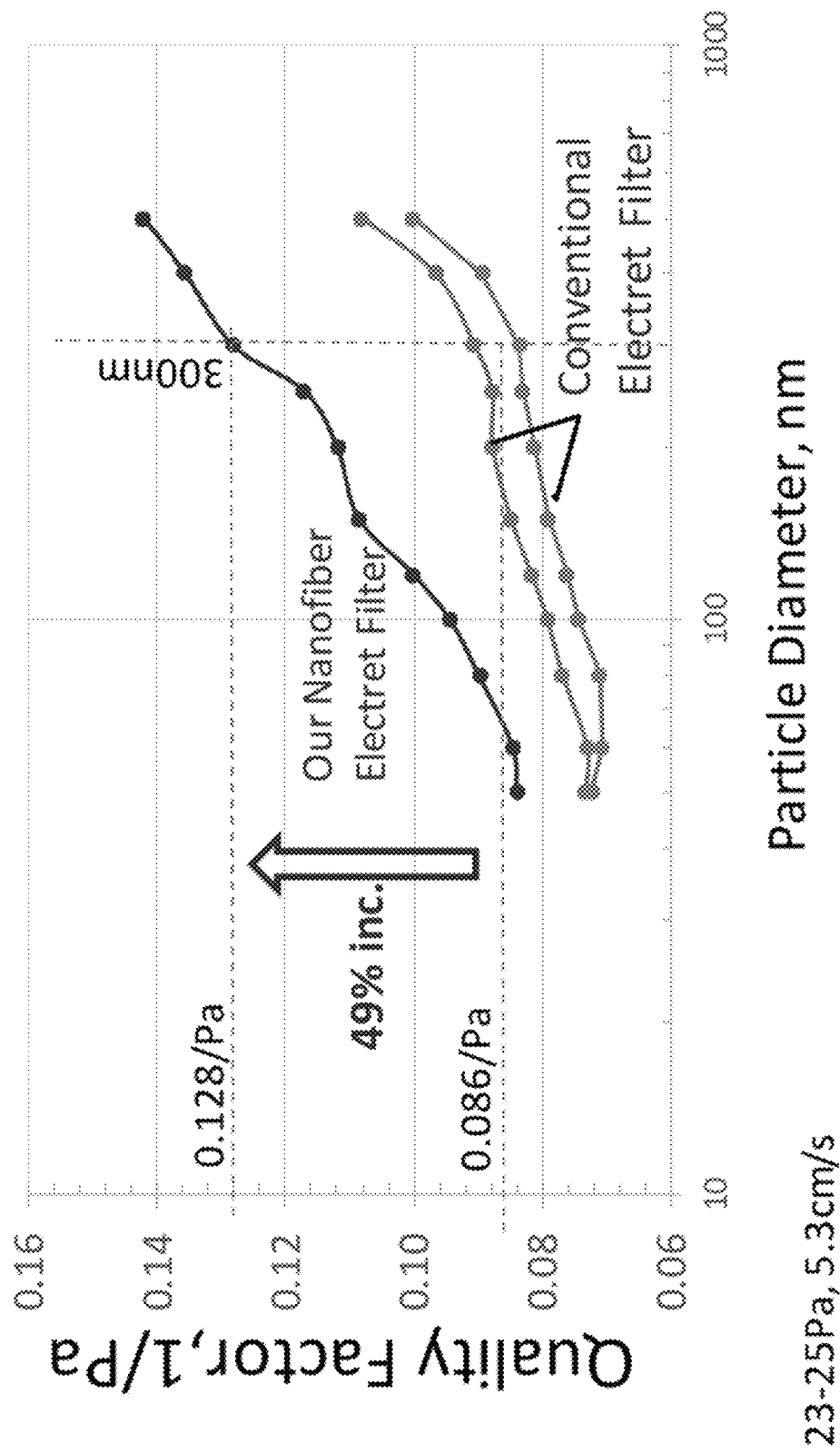
FIG. 16A is a graph showing the comparison on the quality factors between the charged multilayer nanofiber filter of FIG. 3 and two conventional electret filters.
Figure 17:
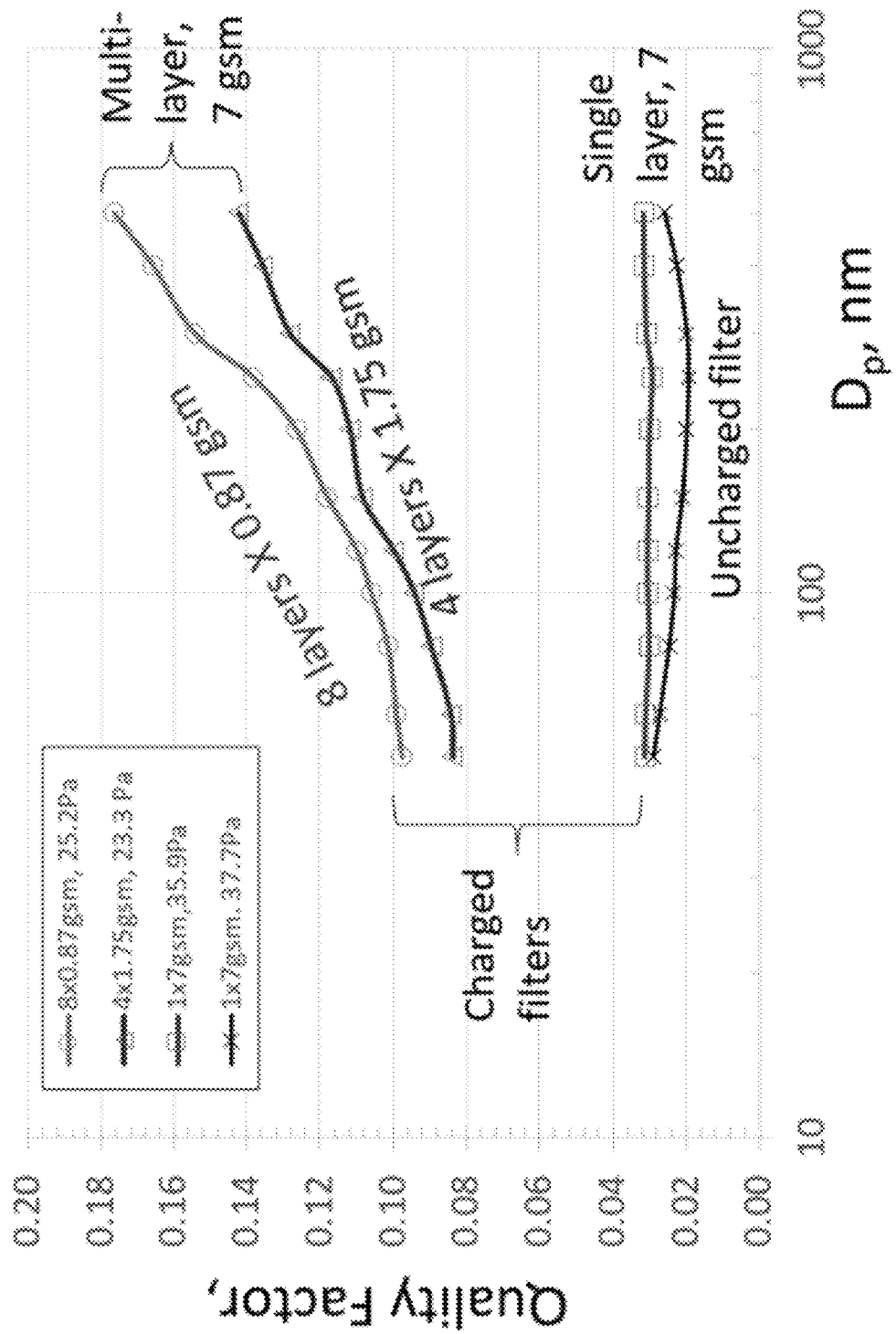
FIG. 17 is a graph showing the comparison on the quality factor between single layer and the charged multilayer nanofiber filter of FIG. 15A.

QF has a unit of 1/Pa. A higher QF represents a better performance of the filter. As shown in FIG. 16A, the QF increases by approximately 49% when the charged multilayer nanofiber filter 24 of the present disclosure is used instead of the conventional electret filters. This observation is further evidenced in FIG. 17, the QF of the charged multilayer nanofiber filter 24 is far better than the discharged and uncharged single-layer filters. Further, the QF is notably higher for large particles than the smaller ones. This behavior again is in agreement with the foregoing analysis on the filtration efficiency. For example, for the same 300 nm test aerosol, the quality factor is 0.128/Pa for 4X1.75 gsm, while it is higher at 0.155/Pa for 8X0.87 gsm.

Figure 16B:
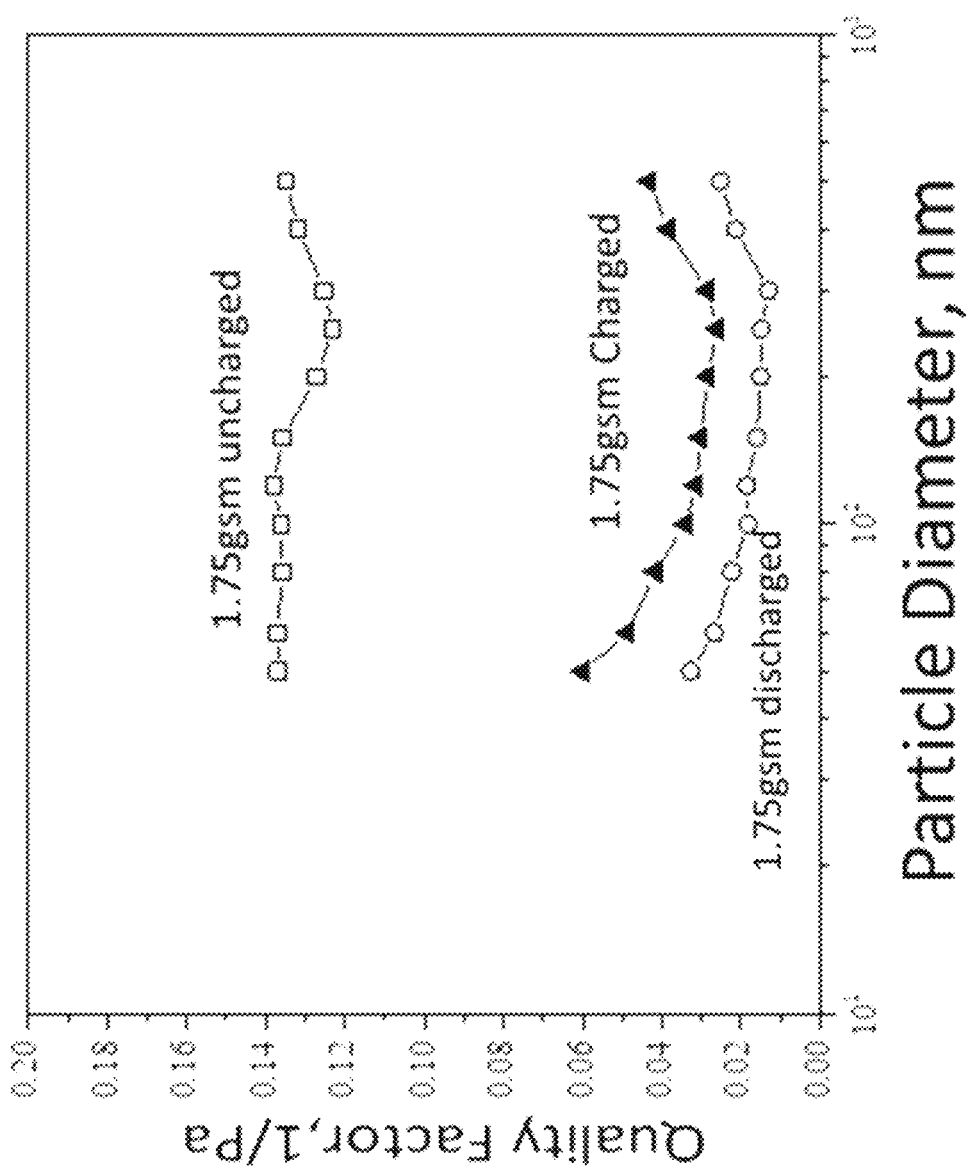
FIG. 16B is a graph showing the comparison on the quality factors between single layer of prestine (after electrospinning), charged and discharged nanofiber filters of 1.75 gsm.

Now referring to FIG. 16B, there was a 1.0-3.3 fold increase in QF from 0.026-0.069 Pa$^{-1}$ in a pristine filter to 0.123-0.138 Pa$^{-1}$ in a charged filter, which resulted from the higher filtration efficiency and relatively low pressure drop PD of 7.4 Pa. Benefiting from the notable electrostatic force, the PVDF electret filter was shown to obtain good filtration performance without incurring high air resistance.

Accordingly, various methods and structures for developing an electrostatically charged nanofiber media for air filtration are provided. While exemplary embodiments have been presented in the foregoing detailed description of the invention, it should be appreciated that a vast number of equivalent variations exist. It should also be appreciated that these exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims and their legal equivalents.

Applications of the Present Invention

According to the embodiments disclosed above, the electrostatically-charged and charge-insulated nanofiber media, as fabricated by stacking a plurality of charged nanofiber mats 23 to form a charged multilayer nanofiber filter 24, can be applied in a wide range of applications:

(1) Air Filtering

Filter such as face mask and other filtration media in respiratory devices can be designed using the charged multilayer nanofiber filter 24 as presently disclosed. The filters can be used for general consumers or medical practitioners for protection against inhalation of dust, pollutants, allergens, virus, or other particles. The charged multilayer nanofiber filter 24 is subjected to low aerosol loading, and it is particularly effective for removing neutral charged particles 30 and/or charged particles (e.g. viruses, typically negatively charged) suspended in the air.

(2) Western Blot Process

Western blot is widely used in molecular biology for detecting or extracting specific proteins in a sample. There are various methods for transferring biological molecules, for example, proteins, nucleic acid fragments, from a gel matrix to a membrane support for the subsequent detection of those molecules. Western blotting is the method used for immuno-detection of proteins. The charged multilayer nanofiber filter 24 of the present disclosure provides an ideal medium for the western blot process. In particular, the charged multilayer nanofiber filter 24 of the present disclosure can efficiently absorbed protein as compared to other conventional films. Therefore, it is more preferable for protein biomarkers identification.

In Western blot, the protein sample is spread by gel electrophoresis into a two-dimensional layout or map, with the first dimension referring to the isoelectric point (pH at which they have a neutral net charge) and the second dimension based on the molecular weight. This is referred to as the two-dimensional gel, or 2D gel, which is a conventional practice. To detect the proteins on the 2D gel by antibody, the proteins within the gel are transferred onto a charged membrane, typically made of PVDF.

The method for making an effective charged multilayer nanofiber filter 24 for the use as an electret air filter (FIG. 3) can be used for making the charged membrane in Western blot process with charges (typically positive) on the membrane surface. The charge membrane is characterized with membrane being permeable with micron-sized pores similar to FIGS. 22A-22E.

The most popular method for transferring the proteins is electroblotting, which uses an electric current to pull the "negatively" charged proteins (analogous to the negative charged viruses in the case of air filtering) from the gel towards the positively charged anode, and into the positively charged PVDF membrane (similar to the PVDF charged multilayer nanofiber filter 24). The proteins move from within the gel onto the membrane while maintaining the organization they had within the gel. Advantageously, the strong positive charges developed by the multilayer nanofibers provides a large attractive electrostatic force to hold onto the negatively charged protein, thereby maintaining the protein integrity, without affecting its organization. In some protein molecules, or part of the protein molecules, wherein there is no inherent charge, the situation is similar to the neutral charged particles 30 in air filtration. As the proteins are in close proximity of the charged PVDF charged multilayer nanofiber filter 24, dipoles are induced onto the neutrally charged protein molecules or part of the protein molecules. Subsequently, the electrostatic attraction between the charged nanofibers with the opposite charge of the induced dipoles "capture" the protein similar to capturing the neutral charged particles 30 in FIG. 4. The proteins are captured and anchored onto the PVDF nanofiber mat. In fact, larger protein molecules, similar to the larger sized aerosols, have larger induced dipoles, and can be captured more effectively. This is more advantageous than using the conventional PVDF membrane. Also, the surface area offered by the charged multilayer nanofiber filter 24 is much more than a flat PVDF membrane due to the small nanofiber diameter of 500 nm or less.

Another method of transferring protein involves placing a charged multilayer nanofiber filter 24 on top of the gel, and a stack of filter papers on top of that. The entire stack is placed in a buffer solution which moves up the paper by capillary force bringing the proteins with it. This method is not commonly used due to the lengthy procedure time and the small pore size of the membrane. However, the multilayer charged nanofiber mat 24 offers micron-sized opening (unlike the case of a membrane with submicron pore openings) facilitating the permeation of proteins onto the membrane relatively fast. This may further revive this approach for popular use.

(3) Drug Delivery

The present invention can also be used for releasing protein-based drugs using encapsulation. By releasing the charges or neutralizing the charges under external electric field or with a neutralizing fluid in contact with the charged multilayer nanofiber filter 24 of the present disclosure, the drugs can be effectively delivered.

When the drugs are made into powder in form of sub-millimeter-sized, micron-sized and even nano-sized particles, they are similar to the aerosols in FIG. 4. These fine drug particles carry electrostatic charges during making and processing (such as grinding from larger to smaller sizes). If they do not have any initial electrostatic charges, when these drug particles get close to the charged multilayer nanofiber filter 24, dipoles are induced onto the particles and they are being captured by the charged multilayer nanofiber filter 24, similar to that of the case in air filtering. The drug particles can be captured in the entire thickness of the nanofiber mat 23 in FIG. 3. These nanofiber mats 23 can be stacked up to form a multilayer drug release platform as detailed throughout the specification of the present disclosure.

As an example, two layers of the asthma drug loaded charged PVDF nanofiber mats are integrated in a multilayer face mask containing 5 layers. The asthma drug-loaded two layers faces the users face, while the other three layers without drug faces outside for capturing undesirable aerosols from outside. As the user is inhaling, ambient air containing aerosols are removed by the 3 layers of charged multilayer nanofiber filter 24 (without drug) and as the fresh air is subsequently inhaled close to the user, the moisture breathed out by the user can neutralize the charges of the two drug-loaded layers thereby releasing the drug slowly in fresh air for which the user can inhale together with the fresh air. Obviously other drugs that can be delivered by inhalation can be done similarly.

Given the stability of charges in the charged multilayer nanofiber filter 24, the drug loaded onto the nanofiber mat 22 can have long shelf life of at least 3 months. This can be extended if they are being sealed (by packaging) from a humid environment. The drug in micron-sized or nano-sized stable droplet form can also be captured and attached onto the charged nanofiber mat 23 for which they are subsequently made into a multilayer arrangement. This broadens the form of drug to both particles or droplets.

Other than inhaling, the drug can also be loaded onto a charged multilayer nanofiber filter 24 that can be applied topically over skin of the body. As the moisture being secreted out of the body through the epidermis of the skin, the charges holding the drug onto the nanofibers are slowly neutralized and the drug can be applied across the skin effectively due to the micron-sizes and nano-sizes (particles or droplet). Droplets may be more favorable in the topical application of drug delivery. Therefore, a key advantage of the present disclosure for the application of drug release is that the highly permeable porous structure of the charged multilayer PVDF mat favors the air/moisture in flowing through the mat no matter whether the mat is applied to face for inhaling or on the skin for topical application.

(4) Other Applications

The present invention may also be used in other applications where trapped electrostatic charges are needed. For example, it may be used as a therapeutics membrane for face or other local regions of the body.

Advantages of the Present Invention

Accordingly, the electrostatically-charged and charge-insulated nanofiber media, as fabricated by stacking a plurality of charged nanofiber mats 23 to form a charged multilayer nanofiber filter 24, has advantages over other previously proposed methods in a variety of different applications, as detailed below:

(1) Neutrally Charged Particles

As particles approach closely to a positively charged multilayer nanofiber filters 24, dipoles are induced on the particle resulting in dipoles of negative charges at the front end and positive charges at the rear end of the particle. The negative charges on the particle interact with the positive charged fiber resulting in capturing of particle at close range to the nanofiber.

(2) Negatively Charged Particles (e.g. Viruses)

Similar to the case of the neutrally charged particles, the present disclosure provides a positively charged multilayer nanofiber filters 24 that can attract negatively charged particles by Coulombic force. Such force is inversely related to the square of the separation distance, as explained in Equation (2). Therefore, the force is stronger when the negatively charged particles are closer to the charged multilayer nanofiber filters 24. This is particularly useful for attracting virus as the DNA inside a virus has a distinct negative electrical charge.

(3) Mechanical Mechanisms

Other than electrostatic forces, the mechanical mechanisms with respect to the diffusion and interception are also at work in combination with the electrostatic forces.

(4) Electrical Field

Nanofiber presents large surface area and small fiber diameter of less than 1000 nanometers, which results in a very intense electrical field with force proportional inversely to the radius to the second (and third) power. As demonstrated in the calculations in the Equation (3), existing electret media made from microfibers with much larger fiber diameter (2-10 micrometers) has a lower surface area and therefore a reduction in the electrical force as compared with the nanofiber is resulted.

(5) Pressure Drop or Permeability of Media

Pressure drop or permeability of media remains unchanged with the added electrostatic charges. This can further boost the capture efficiency of charged particles or protein molecules.

(6) Higher Dielectrophoretic Effect

The filtration efficiency from the dielectrophoretic effect of a single layer of nanofiber is less than satisfactory. The charged multilayer nanofiber filters 24 of the present disclosure are found to achieve better filtration efficiencies even if the same amount of fiber (same thickness) is used. As the charged multilayer nanofiber filters 24 is made up of a plurality of thin nanofiber mats 22 separated by substrate layers 20, which can be partitions or permeable scrim materials. Therefore the structure provides a much higher dielectrophoretic effect than the configuration having the same amount of nanofibers (same gsm) but all integrated into a single layer of nanofiber.

(7) Stability and Durability

Figure 14A:
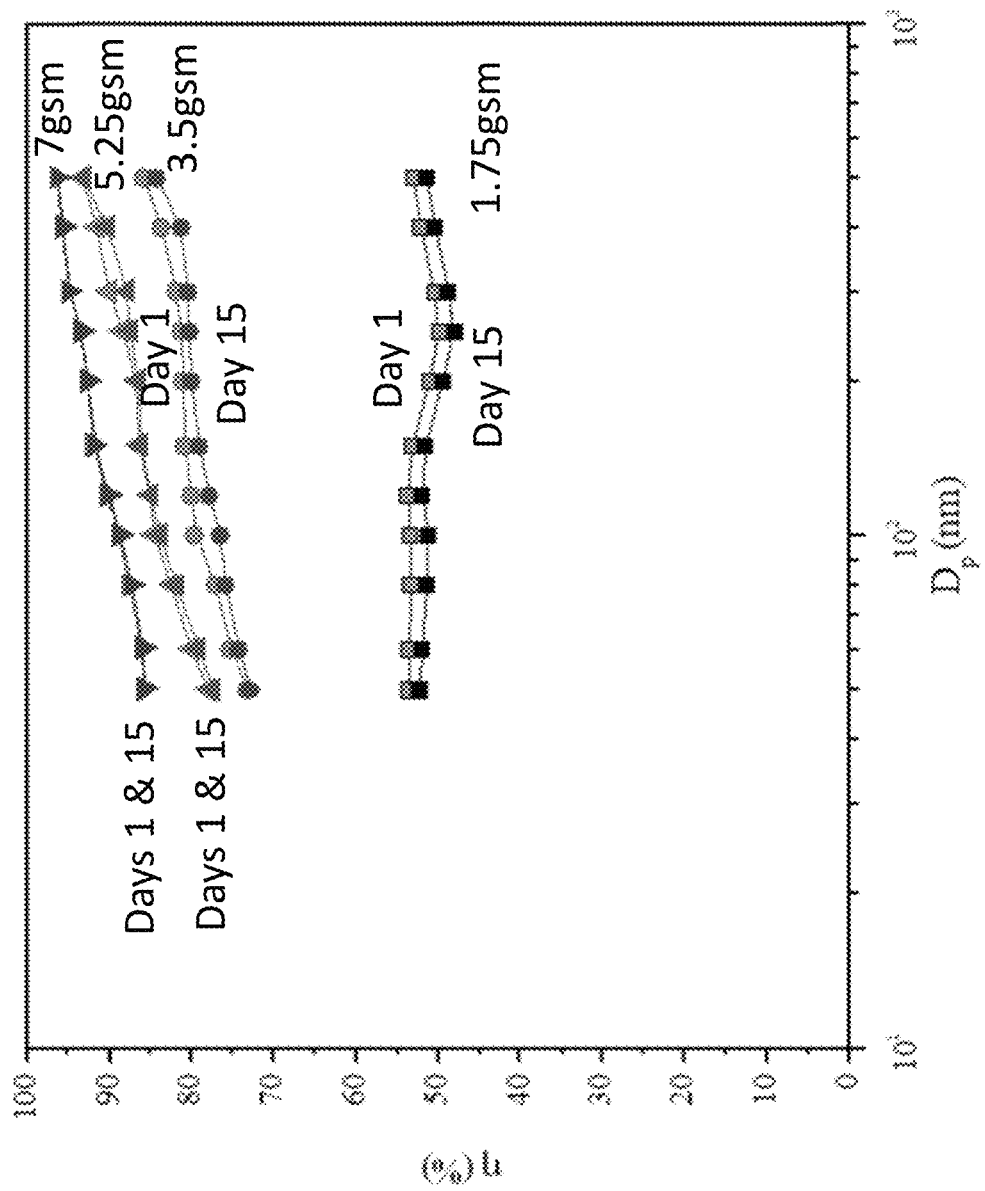
FIG. 14A is a graph showing the filtration efficiency of the charged multilayer nanofiber filter of FIG. 3 with different gsm after two weeks under humid ambient (80% RH).

Another improvement achieved by the present disclosure is the stability and durability of charges over time and humid condition. As shown in FIG. 14A, experimental results under 80% RH for charged multilayer nanofiber filters 24 with thickness of 1.75, 3.5, 5.25, and 7 gsm are presented. The filtration efficiency of each filter is measured on day 1 and day 15. Consistently, the filter performance remains unchanged after exposing the filter in humid ambient for 15 days. This demonstrates the good durability of the nanofiber filter of the present disclosure.

Figure 14B:
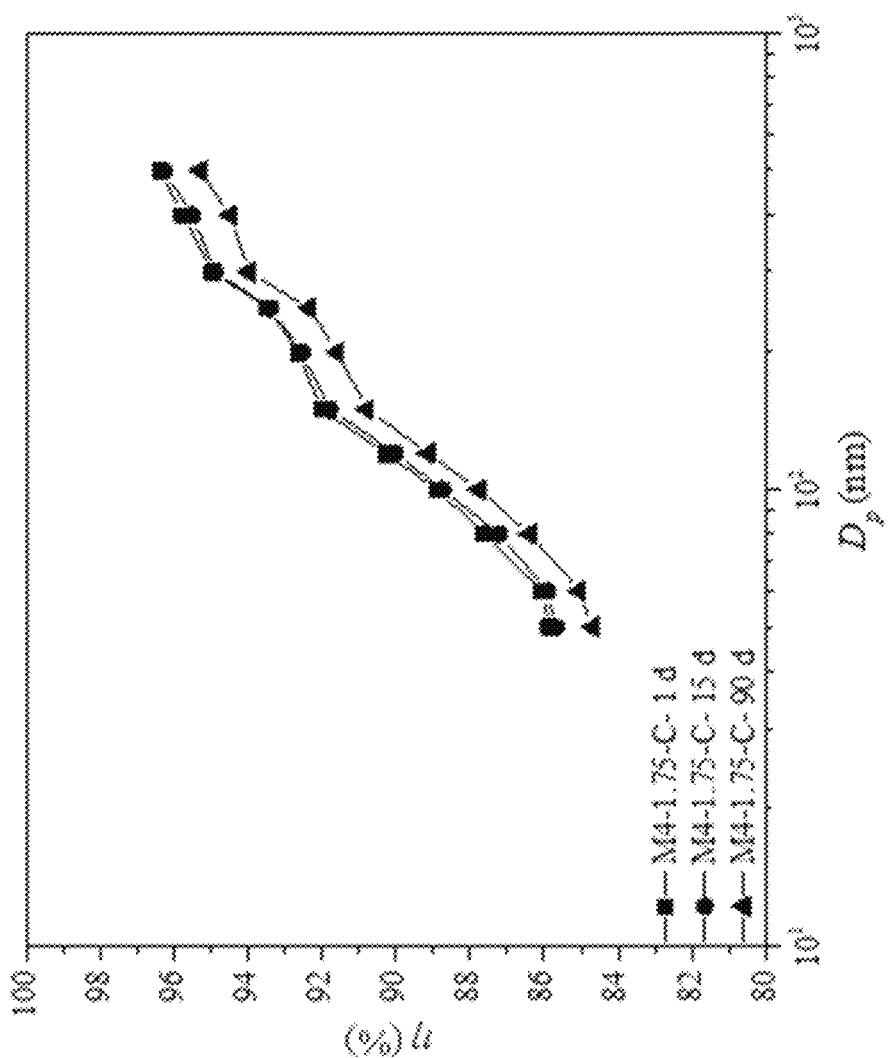
FIG. 14B is a graph showing the filtration efficiency of the charged multilayer nanofiber filter of FIG. 3 with 4 layers of 1.75 gsm after storing for 1, 15, and 90 days, respectively.

The durability is further demonstrated when checking the performance after prolonged storage. Charge on or within filter medium will dissipate with time, whose decay is greatly affected by the polymeric material and is detrimental to electret filters. Since electret filters are generally designed to have a more open structure than mechanical filters, once electrostatic effect is lost and only mechanical capture mechanisms can operate, there will be a drastic drop in filtration performance. The filtration efficiency tests on the charged multilayer nanofiber filter 24 were carried out at different time after the preparation of M4-1.75-C. As shown in FIG. 14B, 1 day after charging, there was an apparent drop in filtration efficiency compared to that acquired immediately after charging. Nevertheless, the filter performance was still quite satisfactory, and filtration efficiency was almost unchanged after 15 days. Even when the storage time was prolonged to 90 days, there was only an insignificant decrease of about 1%. The decay of filtration efficiency was in conformity to the surface potential change with time.

Figures 24A, 24B:
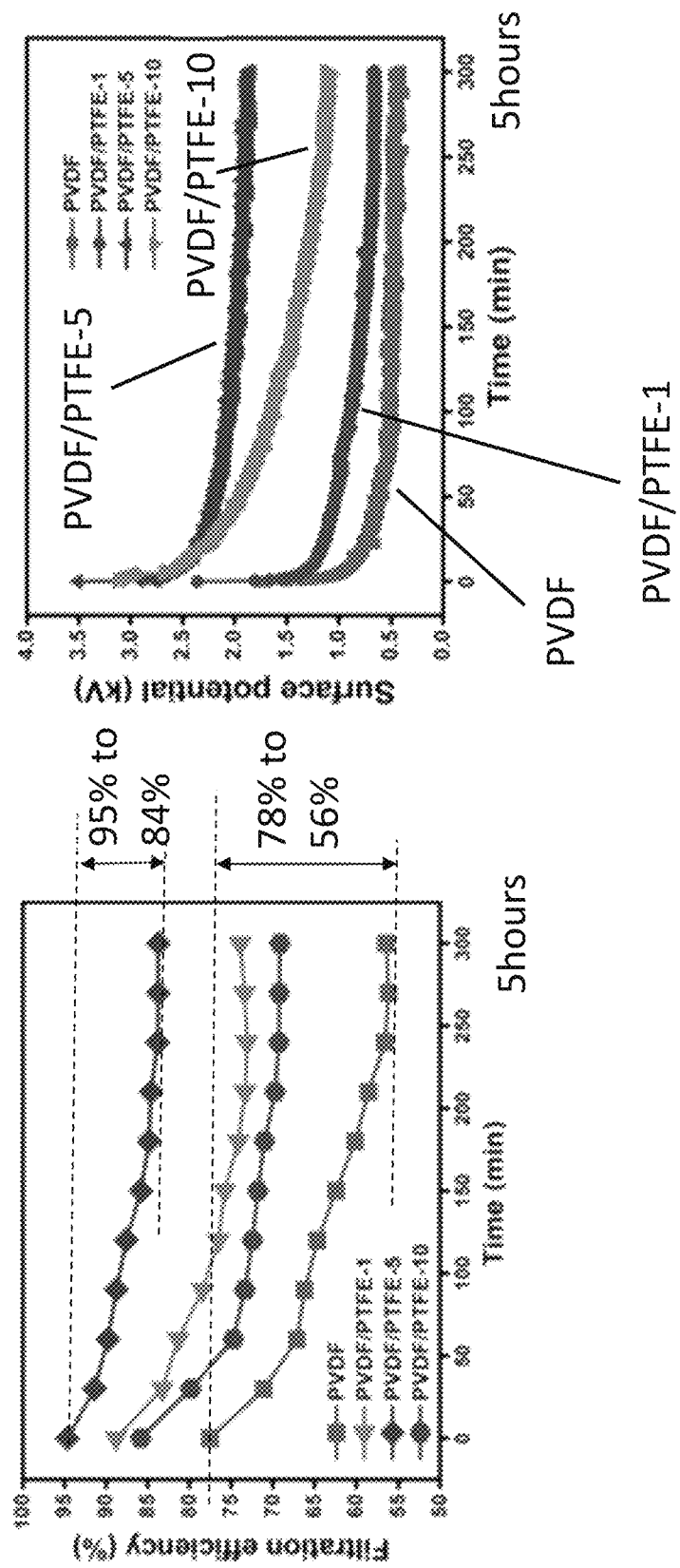
FIG. 24A is a graph showing the change of the filtration efficiency of PVDF, PVDF/PTFE-1, PVDF/PTFE-5 and PVDF/PTFE-10 over 5 hours in accordance with the conventional approach disclosed in [1].
FIG. 24B is a graph showing the change in the surface potential of PVDF, PVDF/PTFE-1, PVDF/PTFE-5 and PVDF/PTFE-10 over 5 hours in accordance with the conventional approach disclosed in [1].

In contrast, as shown in FIGS. 24A and 24B, the conventional approach as disclosed in [1], using PVDF nanofiber mat with PTFE nanoparticles is analyzed. Over 5 hours, the charges decay rapidly. The filtration efficiency and surface potential both plummet down. This is not preferable for trapping electrostatic charges and these nanofiber filters cannot achieve the advantages of the present disclosure. The test results showed the multi-layer PVDF electret filters are preferred for long-term storage and filtration use.

LIST OF REFERENCES

There follows a list of references that are occasionally cited in the specification. Each of the disclosures of these references is incorporated by reference herein in its entirety.
[1] Shan Wang, et al., Electret Polyvinylidene Fluoride Nanofibers Hybridized by Polytetrafluoroethylene Nanoparticles for High-Efficiency Air Filtration. ACS Applied Materials & Interfaces 2016 8 (36), 23985-23994.

What is claimed is:

1. A method for fabricating a charged multilayer nanofiber filter having a first gsm, the charged multilayer nanofiber filter capable of inducing dipoles on neutrally charged particles to obtain charged particles, and capturing the charged particles for performing air filtration, the method comprising the steps of:
    fabricating a plurality of charged nanofiber mats wherein fabricating an individual charged nanofiber mat comprises the steps of:
        electrospinning a polymer solution on a substrate layer to obtain a nanofiber mat consisting of a nanofiber layer and the substrate layer; and
        charging the nanofiber mat to obtain the individual charged nanofiber mat of a second gsm, causing a surface potential of the individual charged nanofiber mat to be increased to thereby improve a filtration efficiency of the charged multilayer nanofiber filter, wherein the second gsm is less than the first gsm; and
    assembling the plurality of charged nanofiber mats to form the charged multilayer nanofiber filter, wherein the plurality of charged nanofiber mats is arranged in parallel to each other; and the charged multilayer nanofiber filter has a higher filtration efficiency and a lower pressure drop than a single layer filter or an uncharged filter having said first gsm.

2. The method of claim 1, wherein the fabricating of the individual charged nanofiber mat further comprises the step of drying the nanofiber mat in a vacuum oven to remove any residual solvent.

3. The method of claim 1, wherein the fabricating of the individual charged nanofiber mat further comprises the step of discharging the nanofiber mat by soaking the nanofiber mat in alcohol or water to remove residual charges from electrospinning prior to charging, thereby charging performance of the nanofiber mat is improved.

4. The method of claim 1, wherein the step of assembling the plurality of charged nanofiber mats comprises assembling the plurality of charged nanofiber mats such that the nanofiber layers and the substrate layers in the plurality of charged nanofiber mats are stacked together in an alternative manner.

5. The method of claim 1, wherein the charging the nanofiber mat comprises charging the nanofiber mat by corona discharge with a charging voltage of 10 kV to 20 kV and a charging distance of 20 mm to 40 mm for a period of 20 to 100 seconds.

6. The method of claim 1, wherein the step of charging the nanofiber mat comprises charging the nanofiber mat by corona discharge with a charging voltage of 15 kV and a charging distance of 30 mm for a period of 60 seconds.

7. The method of claim 1, wherein the step of charging the nanofiber mat comprises charging the nanofiber mat by triboelectric effect.

8. The method of claim 1, wherein the polymer solution comprises PVDF, DMF, and acetone.

9. The method of claim 1, wherein the substrate is a grounded or negatively charged collector made of anti-static nonwoven microfibers for removing residual charges after electrospinning.

10. A charged multilayer nanofiber filter having a first gsm, the charged multilayer nanofiber filter having a plurality of charged nanofiber mats assembled, wherein:
    the charged multilayer nanofiber filter is capable of inducing dipoles on neutrally charged particles to obtain charged particle, and capturing the charged particles for performing air filtration;
    each individual charged nanofiber mat having a second gsm is a nanofiber mat being electrostatically charged individually, causing a surface potential of the individual charged nanofiber mat to be increased to thereby improve a filtration efficiency of the charged multilayer nanofiber filter; and
    the nanofiber mat consists of a nanofiber layer and a substrate layer,
    wherein:
    the second gsm is less than the first gsm; and
    the charged multilayer nanofiber filter has a higher filtration efficiency and a lower pressure drop than a single layer filter or an uncharged filter having said first gsm.

11. The charged multilayer nanofiber filter of claim 10, wherein the nanofiber mat is a discharged nanofiber mat having residual charges from electrospinning removed, wherein the discharged nanofiber mat is obtained by soaking a pristine nanofiber mat in alcohol or water.

12. The charged multilayer nanofiber filter of claim 10, wherein the plurality of charged nanofiber mats is assembled such that the nanofiber layers in the plurality of charged nanofiber mats and the substrate layers are stacked together in an alternative manner.

13. The charged multilayer nanofiber filter of claim 10, wherein each charged nanofiber mat is charged by corona discharge with a charging voltage of 10 kV to 20 kV and a charging distance of 20 mm to 40 mm for a period of 20 to 100 seconds.

14. The charged multilayer nanofiber filter of claim 10, wherein each charged nanofiber mat is charged by corona discharge with a charging voltage of 15 kV and a charging distance of 30 mm for a period of 60 seconds.

15. The charged multilayer nanofiber filter of claim 10, wherein each charged nanofiber mat is charged by triboelectric effect.

16. The charged multilayer nanofiber filter of claim 10, wherein the polymer comprises PVDF, DMF, and acetone.

17. The charged multilayer nanofiber filter of claim 10, wherein the substrate is made of anti-static nonwoven microfibers for removing residual charges after electrospinning.

* * * * *